United States Patent
Kobayashi

(10) Patent No.: US 11,921,012 B2
(45) Date of Patent: *Mar. 5, 2024

(54) ABNORMALITY DETERMINATION FOR BRIDGE SUPERSTRUCTURE BASED ON ACCELERATION DATA

(71) Applicant: Seiko Epson Corporation, Tokyo (JP)

(72) Inventor: Yoshihiro Kobayashi, Komagane (JP)

(73) Assignee: SEIKO EPSON CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/680,453

(22) Filed: Feb. 25, 2022

(65) Prior Publication Data

US 2022/0276119 A1 Sep. 1, 2022

(30) Foreign Application Priority Data

Feb. 26, 2021 (JP) .................................. 2021-029995

(51) Int. Cl.
 *G01M 5/00* (2006.01)
(52) U.S. Cl.
 CPC ........ *G01M 5/0008* (2013.01); *G01M 5/0066* (2013.01)
(58) Field of Classification Search
 CPC . G01M 5/0008; G01M 5/0041; G01M 5/0066
 See application file for complete search history.

(56) References Cited

U.S. PATENT DOCUMENTS

| | | | |
|---|---|---|---|
| 2006/0159135 A1* | 7/2006 | Cliche ................... | H01S 5/0687 372/38.08 |
| 2009/0024336 A1 | 1/2009 | Tatom et al. | |
| 2012/0089378 A1* | 4/2012 | Lee ..................... | G01M 5/0066 703/2 |
| 2015/0316426 A1 | 11/2015 | Feichtinger et al. | |
| 2021/0293606 A1* | 9/2021 | Kobayashi .............. | G08G 1/02 |
| 2022/0261511 A1* | 8/2022 | Umekawa ........... | G01M 5/0008 |
| 2022/0276118 A1* | 9/2022 | Kobayashi .......... | G01M 5/0008 |

FOREIGN PATENT DOCUMENTS

| | | | |
|---|---|---|---|
| CN | 203305802 U | * | 11/2013 |
| EP | 3187838 A1 | | 7/2017 |
| JP | 2009-237805 A | | 10/2009 |

(Continued)

OTHER PUBLICATIONS

JP2015183362A, translation (Year: 2015).*

(Continued)

*Primary Examiner* — Lina Cordero
(74) *Attorney, Agent, or Firm* — Harness, Dickey & Pierce, P.L.C.

(57) ABSTRACT

A measurement method includes: a high-pass filter processing step of performing high-pass filter processing on target data including a drift noise to generate drift noise reduction data in which the drift noise is reduced, a correction data estimation step of estimating, based on the drift noise reduction data, correction data corresponding to a difference between the drift noise reduction data and data obtained by removing the drift noise from the target data, and a measurement data generation step of generating measurement data by adding the drift noise reduction data and the correction data.

14 Claims, 17 Drawing Sheets

(56) References Cited

FOREIGN PATENT DOCUMENTS

| | | | | |
|---|---|---|---|---|
| JP | 2015-140537 | A | | 8/2015 |
| JP | 2015183362 | A | * | 10/2015 |
| JP | 2019-049095 | A | | 3/2019 |
| JP | 2021147820 | A | * | 9/2021 |
| JP | 2021148526 | A | * | 9/2021 |
| JP | 2022131020 | A | * | 9/2022 |

OTHER PUBLICATIONS

JP2019049095A, IDS record, translation (Year: 2019).*
JP2015140537A, IDS record, translation (Year: 2015).*
Kilikevicius, Arturas & Bacinskas, Darius & Kamaitis, Zenonas; "A Sensor Instrumentation Method for Dynamic Monitoring of Railway Bridges"; Journal of Vibroengineering; vol. 15; Year 2013; pp. 176-184 (total 9 pages).
Pietrzak et al., "Dynamic Mass Measurement in Checkweighers Using a Discrete Time-Variant Low-Pass Filter", Mechanical Systems and Signal Processing, 48, Year 2014; pp. 67-76 (total 10 pages).

* cited by examiner

ABNORMALITY DETERMINATION FOR BRIDGE SUPERSTRUCTURE BASED ON ACCELERATION DATA

The present application is based on, and claims priority from JP Application Serial Number 2021-029995, filed Feb. 26, 2021, the disclosure of which is hereby incorporated by reference herein in its entirety.

BACKGROUND

1. Technical Field

The present disclosure relates to a measurement method, a measurement device, a measurement system, and a measurement program.

2. Related Art

JP-A-2009-237805 describes a displacement acquisition device including: a static component storage unit that stores a time series of a static component that is a component independent of motion of a railway vehicle in a time series of a displacement of a girder of a bridge accompanying passage of the railway vehicle; a displacement detection unit that detects a time series of a displacement of a girder of a bridge to be measured based on at least one of an acceleration measurement value and a velocity measurement value of the girder of the bridge to be measured accompanying passage of a railway vehicle to be measured; a dynamic component extraction unit that extracts a time series of a dynamic component that is a remaining component obtained by removing a static component that may include an error from the time series of the displacement detected by the displacement detection unit; a static component acquisition unit that acquires the time series of the static component from the static component storage unit; and a synthesis unit that synthesizes the time series of the dynamic component extracted by the dynamic component extraction unit and the time series of the static component acquired by the static component acquisition unit.

According to the displacement acquisition device described in JP-A-2009-237805, by removing the static component that may include an error from the time series of the displacement of the detected girder and replacing the static component with the stored static component, the time series of the displacement eliminating the error can be obtained.

However, in the displacement acquisition device described in JP-A-2009-237805, since approximability between the static component included in the time series of displacement of the detected girder and the stored static component greatly affects accuracy of the obtained time series of the displacement, when accuracy of the approximability is not sufficient, the accuracy of the time series of the displacement may decrease. In the displacement acquisition device described in JP-A-2009-237805, when a static component included in a time series of a displacement at a measurement time point changes due to a change in environment or the like, no unit is provided for recognizing a deviation between the static component and the stored static component, and it is not possible to know that there is a problem in the accuracy of the displacement. In the displacement acquisition device described in JP-A-2009-237805, it is necessary to store data of the static component for each classification of the railway vehicle and each classification of the bridge, and it is necessary to acquire and update the data, which complicates a configuration and makes it difficult to reduce a cost. Therefore, a method of reducing an error without preparing information for reducing an error such as static component data in advance is desired.

SUMMARY

According to an aspect of the present disclosure, a measurement method includes: a high-pass filter processing step of performing high-pass filter processing on target data including a drift noise to generate drift noise reduction data in which the drift noise is reduced; a correction data estimation step of estimating, based on the drift noise reduction data, correction data corresponding to a difference between the drift noise reduction data and data obtained by removing the drift noise from the target data; and a measurement data generation step of generating measurement data by adding the drift noise reduction data and the correction data.

According to an aspect of the present disclosure, a measurement method includes: a high-pass filter processing step of performing high-pass filter processing on target data including a drift noise to generate drift noise reduction data in which the drift noise is reduced; an interval specifying step of calculating a first peak and a second peak of the drift noise reduction data and specifying a first interval before the first peak, a second interval between the first peak and the second peak, and a third interval after the second peak; a correction data estimation step of estimating, based on the drift noise reduction data, correction data in the second interval corresponding to a difference between the drift noise reduction data and data obtained by removing the drift noise from the target data; and a measurement data generation step of generating measurement data by setting data in the first interval as 0, adding the drift noise reduction data and the correction data in the second interval, and setting data in the third interval as 0.

According to an aspect of the present disclosure, a measurement device includes: a high-pass filter processing unit configured to perform high-pass filter processing on target data including a drift noise to generate drift noise reduction data in which the drift noise is reduced; a correction data estimation unit configured to estimate, based on the drift noise reduction data, correction data corresponding to a difference between the drift noise reduction data and data obtained by removing the drift noise from the target data; and a measurement data generation unit configured to generate measurement data by adding the drift noise reduction data and the correction data.

According to an aspect of the present disclosure, a measurement system includes: the measurement device according to the above aspect; and an observation device configured to observe an observation point, in which the target data is data based on observation data observed by the observation device.

According to an aspect of the present disclosure, a non-transitory computer-readable storage medium stores a measurement program, and the measurement program causes a computer to execute: a high-pass filter processing step of performing high-pass filter processing on target data including a drift noise to generate drift noise reduction data in which the drift noise is reduced; a correction data estimation step of estimating, based on the drift noise reduction data, correction data corresponding to a difference between the drift noise reduction data and data obtained by removing the drift noise from the target data; and a measurement data generation step of generating measurement data by adding the drift noise reduction data and the correction data.

DESCRIPTION OF EXEMPLARY EMBODIMENTS

Hereinafter, preferred embodiments of the present disclosure will be described in detail with reference to the drawings. The embodiments to be described below do not in any way limit the contents of the present disclosure described in the claims. Not all configurations to be described below are necessarily essential components of the present disclosure.

1. First Embodiment 1-1. Configuration of Measurement System

Hereinafter, a measurement system for implementing a measurement method according to the present embodiment will be described by taking a case where a structure is a superstructure of a bridge and a moving object is a railway vehicle as an example.

Figure 1:
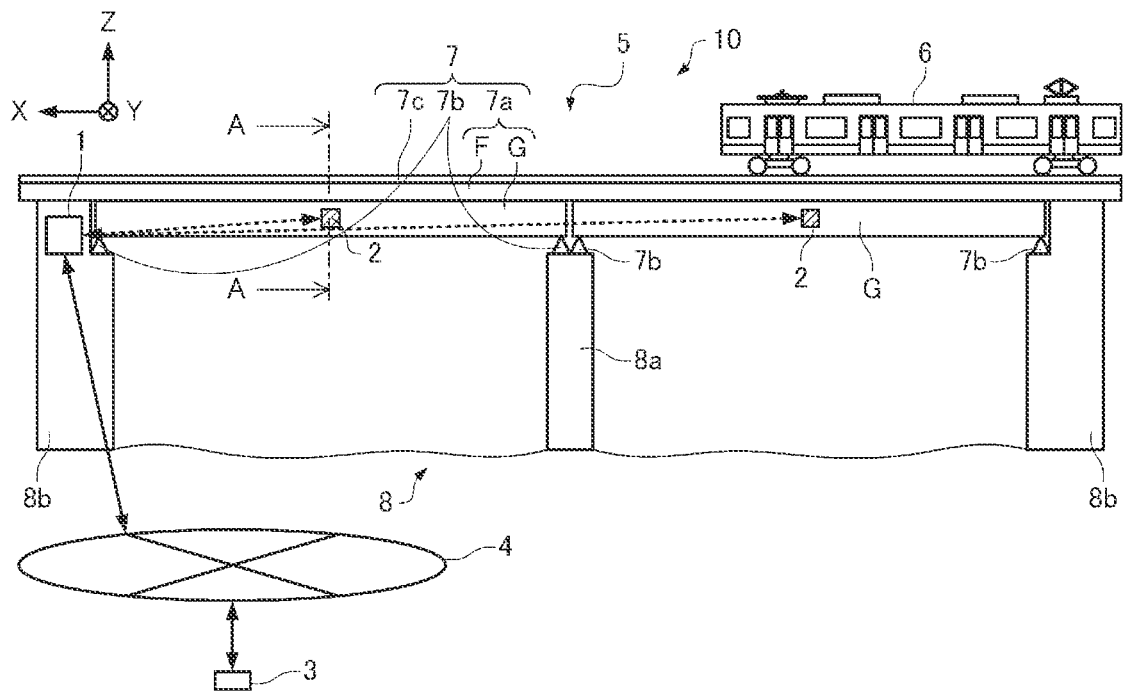
FIG. 1 is a diagram showing a configuration example of a measurement system.

FIG. 1 is a diagram showing an example of a measurement system according to the present embodiment. As shown in FIG. 1, a measurement system 10 according to the present embodiment includes a measurement device 1, and at least one sensor 2 provided on a superstructure 7 of a bridge 5. The measurement system 10 may include a monitoring device 3.

Figure 2:
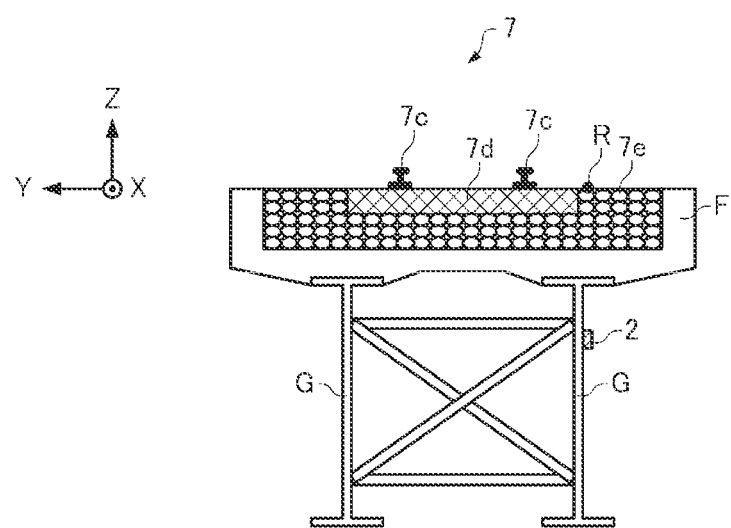
FIG. 2 is a cross-sectional view of a superstructure of FIG. 1 taken along line A-A.

The bridge 5 includes the superstructure 7 and a substructure 8. FIG. 2 is a cross-sectional view of the superstructure 7 taken along line A-A of FIG. 1. As shown in FIGS. 1 and 2, the superstructure 7 includes a bridge floor 7a, a support 7b, rails 7c, ties 7d, and a ballast 7e, and the bridge floor 7a includes a floor plate F, a main girder G, and a cross girder which is not shown. As shown in FIG. 1, the substructure 8 includes bridge piers 8a and bridge abutments 8b. The superstructure 7 is a structure across any one of the bridge abutment 8b and the bridge pier 8a adjacent to each other, two adjacent bridge abutments 8b, and two adjacent bridge piers 8a. Both end portions of the superstructure 7 are located at positions of the bridge abutment 8b and the bridge pier 8a adjacent to each other, at positions of the two adjacent bridge abutments 8b, or at positions of the two adjacent bridge piers 8a.

The measurement device 1 and the sensors 2 are coupled by, for example, a cable which is not shown and communicate with one another via a communication network such as a CAN. CAN is an abbreviation for controller area network. Alternatively, the measurement device 1 and the sensors 2 may communicate with each other via a wireless network.

For example, each sensor 2 outputs data for calculating a displacement of the superstructure 7 caused by a movement of a railway vehicle 6 which is a moving object. In the present embodiment, each of the sensors 2 is an acceleration sensor, and may be, for example, a crystal acceleration sensor or a MEMS acceleration sensor. MEMS is an abbreviation for micro electro mechanical systems.

In the present embodiment, each sensor 2 is installed at position of a central portion of the superstructure 7 in a longitudinal direction, specifically, at a central portion of the main girder G in the longitudinal direction. Each sensor 2 is not limited to being installed at the central portion of the superstructure 7 as long as each sensor 2 can detect an acceleration for calculating the displacement of the superstructure 7. When each sensor 2 is provided on the floor plate F of the superstructure 7, the sensor 2 may be damaged due to traveling of the railway vehicle 6, and the measurement accuracy may be affected by local deformation of the bridge floor 7a, so that in the example of FIGS. 1 and 2, each sensor 2 is provided at the main girder G of the superstructure 7.

The floor plate F, the main girder G, and the like of the superstructure 7 are bent in a vertical direction due to a load of the railway vehicle 6 traveling on the superstructure 7. Each sensor 2 detects an acceleration of the bending of the floor plate F or the main girder G caused by the load of the railway vehicle 6 traveling on the superstructure 7.

The measurement device 1 calculates the bending displacement of the superstructure 7 caused by the traveling of the railway vehicle 6 based on acceleration data output from the sensors 2. The measurement device 1 is installed on, for example, the bridge abutment 8b.

The measurement device 1 and the monitoring device 3 can communicate with each other via, for example, a wireless network of a mobile phone and a communication network 4 such as the Internet. The measurement device 1 transmits information on the displacement of the superstructure 7 caused by the traveling of the railway vehicle 6 to the monitoring device 3. The monitoring device 3 may store the information in a storage device (not illustrated), and may perform, for example, processing such as monitoring of the railway vehicle 6 and abnormality determination of the superstructure 7 based on the information.

In the present embodiment, the bridge 5 is a railroad bridge, and is, for example, a steel bridge, a girder bridge, or an RC bridge. The RC is an abbreviation for reinforced-concrete.

As shown in FIG. 2, in the present embodiment, an observation point R is set in association with the sensor 2. In the example of FIG. 2, the observation point R is set at a position on a surface of the superstructure 7 located vertically above the sensor 2 provided at the main girder G. That is, the sensor 2 is an observation device for observing the observation point R. Although the sensor 2 for observing the observation point R may be provided at a position where the acceleration generated at the observation point R due to the traveling of the railway vehicle 6 can be detected, it is desirable that the sensor 2 is provided at a position close to the observation point R.

The number and installation positions of the sensors 2 are not limited to the examples shown in FIGS. 1 and 2, and various modifications can be made.

The measurement device 1 acquires an acceleration in a direction intersecting the surface of the superstructure 7 on which the railway vehicle 6 moves, based on the acceleration data output from the sensor 2. The surface of the superstructure 7 on which the railway vehicle 6 moves is defined by a direction in which the railway vehicle 6 moves, that is, an X direction which is the longitudinal direction of the superstructure 7, and a direction orthogonal to the direction in which the railway vehicle 6 moves, that is, a Y direction which is a width direction of the superstructure 7. Since the observation point R is bent in a direction orthogonal to the X direction and the Y direction due to the traveling of the railway vehicle 6, it is desirable that the measurement device 1 acquires the acceleration in a direction orthogonal to the X direction and the Y direction, that is, a Z direction which is a normal direction of the floor plate F, in order to accurately calculate a magnitude of the acceleration of the bending.

Figure 3:
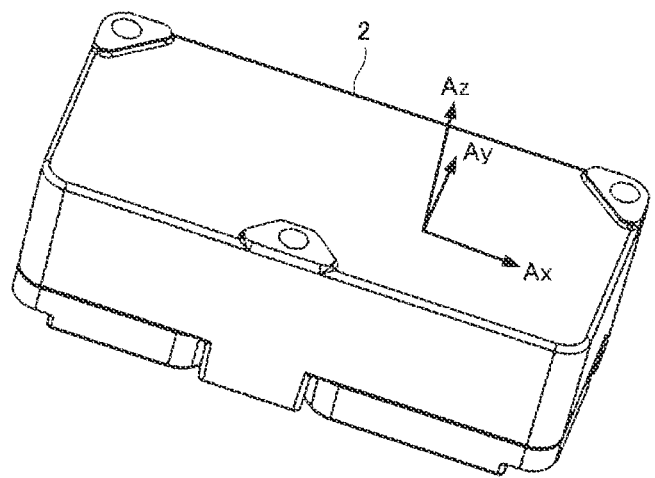
FIG. 3 is a diagram illustrating an acceleration detected by an acceleration sensor.

FIG. 3 is a diagram showing the acceleration axes detected by the sensor 2. The sensor 2 is an acceleration sensor that detects accelerations generated in three axes orthogonal to one another.

In order to detect the acceleration of the bending at the observation point R caused by the traveling of the railway vehicle 6, the sensor 2 is installed such that one of three detection axes, which are the x axis, the y axis, and the z axis, intersects the X direction and the Y direction. In FIGS. 1 and 2, the sensor 2 is installed such that one axis thereof is in a direction intersecting the X direction and the Y direction. The observation point R bends in the direction orthogonal to the X direction and the Y direction. Therefore, in order to accurately detect the acceleration of the bending, ideally, the sensor 2 is installed such that one axis thereof is in the direction orthogonal to the X direction and the Y direction, that is, the normal direction of the floor plate F.

However, when the sensor 2 is installed on the superstructure 7, an installation location may be inclined. In the measurement device 1, even if one of the three detection axes of the sensor 2 is not installed in the normal direction of the floor plate F, since the direction is substantially oriented in the normal direction, an error is small and thus can be ignored. The measurement device 1 can correct a detection error, caused by the inclination of the sensor 2, by a three-axis combined acceleration that is obtained by combining the accelerations in the x axis, the y axis, and the z axis even if one of the three detection axes of the sensor 2 is not installed in the normal direction of the floor plate F. The sensor 2 may be a one-axis acceleration sensor that detects an acceleration generated in a direction at least substantially parallel to the vertical direction or an acceleration in the normal direction of the floor plate F.

Hereinafter, first, the basic concept of the measurement method according to the present embodiment executed by the measurement device 1 will be described, and then the details thereof will be described.

1-2. Basic Concept of Measurement Method

Figure 4:
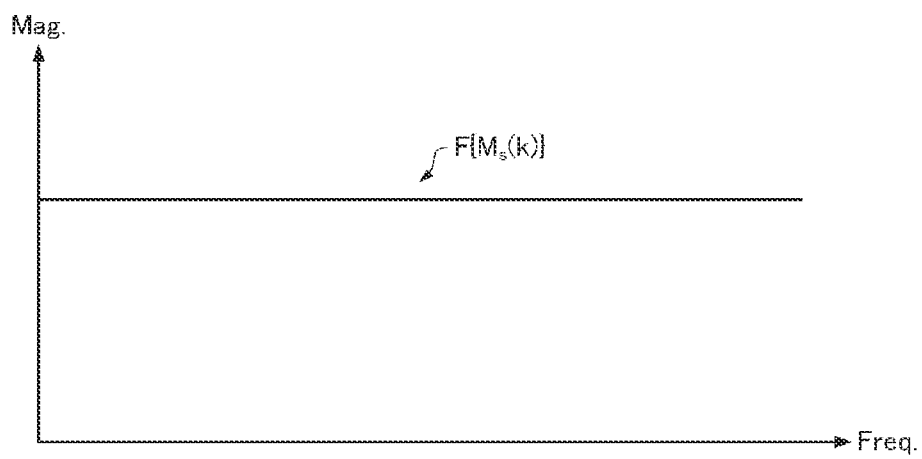
FIG. 4 is a diagram showing a frequency characteristic $F\{M_s(k)\}$ of target data $M_s(k)$.

First, target data to be process, which is displacement data obtained based on the acceleration data output from the sensor 2 is represented by $M_s(k)$, and FIG. 4 is a diagram showing a frequency characteristic $F\{M_s(k)\}$ of the target data $M_s(k)$. When the number of samples included in the target data $M_s(k)$ is N, k is an integer from 0 to N−1.

When data obtained by performing high-pass filter processing on the target data $M_s(k)$ is represented by $f_{HP}(M_s(k))$ and data obtained by performing low-pass filter processing on the target data $M_s(k)$ is represented by $f_{LP}(M_s(k))$, a relationship of the target data $M_s(k)$, the data $f_{HP}(M_s(k))$, and the data $f_{LP}(M_s(k))$ is expressed by Equation (1).

$$M_s(k) = f_{HP}(M_s(k)) + f_{LP}(M_s(k)) \tag{1}$$

Figure 5:
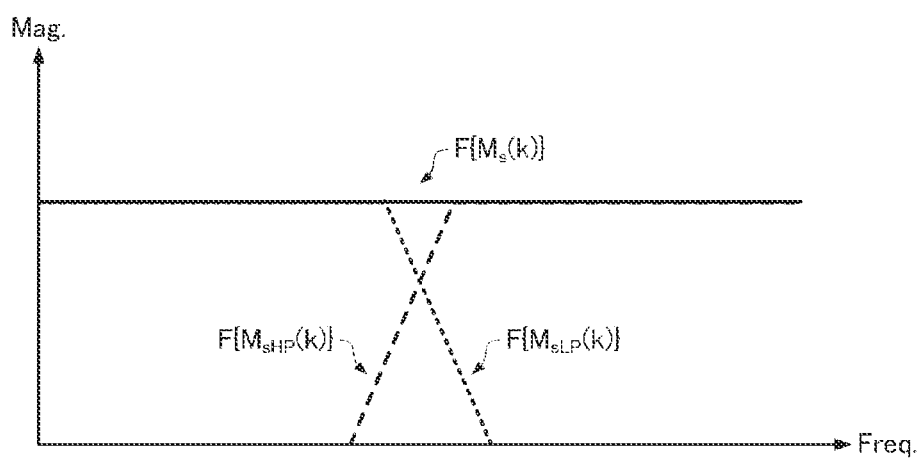
FIG. 5 is a diagram showing a relationship of frequency characteristics $F\{M_s(k)\}$, $F\{f_{HP}(M_s(k))\}$, and $F\{f_{LP}(M_s(k))\}$.

A relationship of the frequency characteristic $F\{M_s(k)\}$ of the target data $M_s(k)$, a frequency characteristic $F\{f_{HP}(M_s(k))\}$ of the data $f_{HP}(M_s(k))$, and a frequency characteristic $F\{f_{LP}(M_s(k))\}$ of the data $f_{LP}(M_s(k))$ is expressed by Equation (2). FIG. 5 is a diagram showing a relationship of the frequency characteristics $F\{M_s(k)\}$, $F\{f_{HP}(M_s(k))\}$, and $F\{f_{LP}(M_s(k))\}$.

$$M_s(k) = F\{f_{HP}(M_s(k))\} + F\{f_{LP}(M_s(k))\} \tag{2}$$

Here, as in Equation (3), it is assumed that the target data $M_s(k)$ obtained based on the acceleration data includes a significant signal $M(k)$ and a drift noise $e(k)$.

$$M_s(k) = M(k) + e(k) \tag{3}$$

Figure 6:
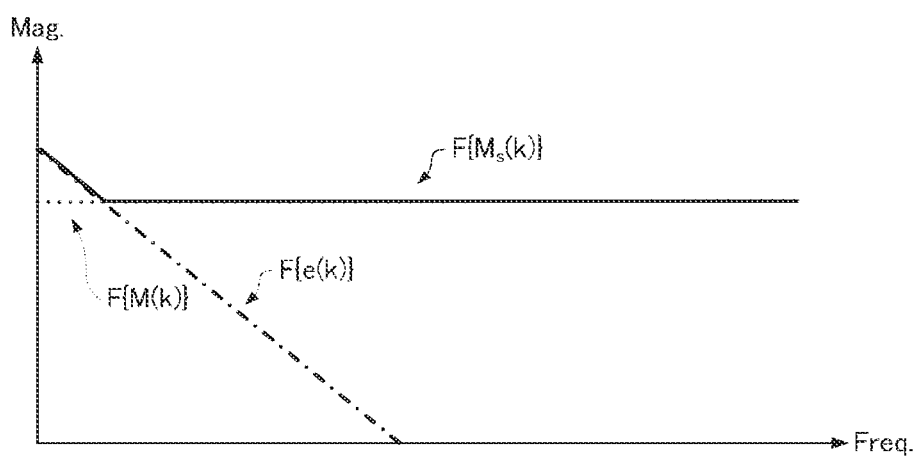
FIG. 6 is a diagram showing a relationship of frequency characteristics $F\{M_s(k)\}$, $F\{M(k)\}$, and $F\{e(k)\}$.
Figure 7:
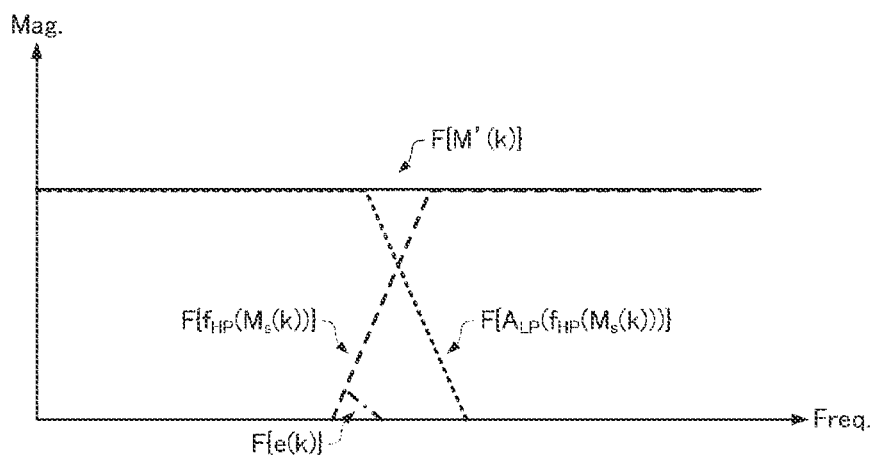
FIG. 7 is a diagram showing a relationship of frequency characteristics $F\{M'(k)\}$, $F\{f_{HP}(M(k))\}$, and $F\{f_{LP}(M(k))\}$.

The drift noise e(k) is mainly not a signal input to the sensor 2, but an error signal generated inside the sensor 2, such as a zero-point error, a drift caused by a temperature change, or a drift caused by nonlinear sensitivity. The drift noise e(k) is a variation of a long period as compared with a signal input to the sensor 2, and has an energy distribution in a low frequency range. FIG. 6 is a diagram showing a relationship of frequency characteristics $F\{M_s(k)\}$, $F\{M(k)\}$, and $F\{e(k)\}$. Since the drift noise e(k) is observed as an offset error, high-pass filter processing for attenuating a signal in a low frequency range is effective in order to remove the drift noise e(k).

It is assumed that, when the high-pass filter processing is performed on the target data $M_s(k)$, the drift noise e(k) that has an energy distribution in the low frequency range is sufficiently reduced, and the data $f_{HP}(M_s(k))$ obtained after the high-pass filter processing is substantially equal to data $f_{HP}(M(k))$ obtained by performing high-pass filter processing on the signal M(k), as in Equation (4).

$$f_{HP}(M_s(k)) \approx f_{HP}(M(k)) \tag{4}$$

Since signal component in the low frequency range of the signal M(k) is also lost by the high-pass filter processing, in order to compensate for this signal component, the data $f_{LP}M(k)$ obtained by performing low-pass filter processing on signal M(k) is estimated based on data $f_{HP}(M_s(k))$ obtained by performing high-pass filter processing on the target data $M_s(k)$. As in Equation (5), it is assumed that the data $f_{LP}(M(k))$ obtained by performing low-pass filter processing on the signal M(k) is substantially equal to data $A_{LP}(f_{HP}(M_s(k)))$ obtained by estimating the data $f_{LP}(M(k))$, which is obtained by performing low-pass filter processing on the signal M(k), based on the data $f_{HP}(M_s(k))$ obtained by performing high-pass filter processing on the target data $M_s(k)$.

$$f_{LP}(M(k)) \approx A_{LP}(f_{HP}(M_s(k))) \tag{5}$$

When it is assumed that the signal M(k) is equal to a sum of the data $f_{HP}(M(k))$ obtained by performing high-pass filter processing on the signal M(k) and the data $f_{LP}(M(k))$ obtained by performing low-pass filter processing on the signal M(k), as in Equation (6), Equation (7) is obtained based on Equation (4), Equation (5), and Equation (6). FIG. shows the relationship of frequency characteristics $F\{M'(k)\}$, $F\{f_{HP}(M_s(k))\}$, and $F\{A_{LP}(f_{HP}(M_s(k)))\}$.

$$M(k) = f_{HP}(M(k)) + f_{LP}(M(k)) \tag{6}$$

$$M(k) \approx M'(k) = f_{HP}(M_s(k)) + A_{LP}(f_{HP}(M_s(k))) \tag{7}$$

Since the data $f_{HP}(M_s(k))$ in which the drift noise e(k) is reduced is obtained by performing high-pass filter processing on the target data $M_s(k)$, the data $f_{LP}(M(k))$ obtained by performing low-pass filter processing on the signal M(k) is estimated based on the data $f_{HP}(M_s(k))$, and the signal M(k) in which the drift noise e(k) is reduced can be obtained by adding the data $f_{HP}(M_s(k))$ and the estimated data.

Hereinafter, a case where the target data $M_s(k)$ is displacement data will be described as an example, and a procedure of estimating the data $f_{LP}(M(k))$, that is obtained by performing low-pass filter processing on the signal M(k), based on the data $f_{HP}(M_s(k))$ obtained by performing high-pass filter processing on the target data $M_s(k)$ will be described.

First, a unit pulse waveform obtained by simplifying a deflection displacement of the superstructure 7 of the bridge 5 when the railway vehicle 6 passes through the superstructure 7 is assumed as the target data $M_s(k)$, as in Equation (8).

Figure 8:
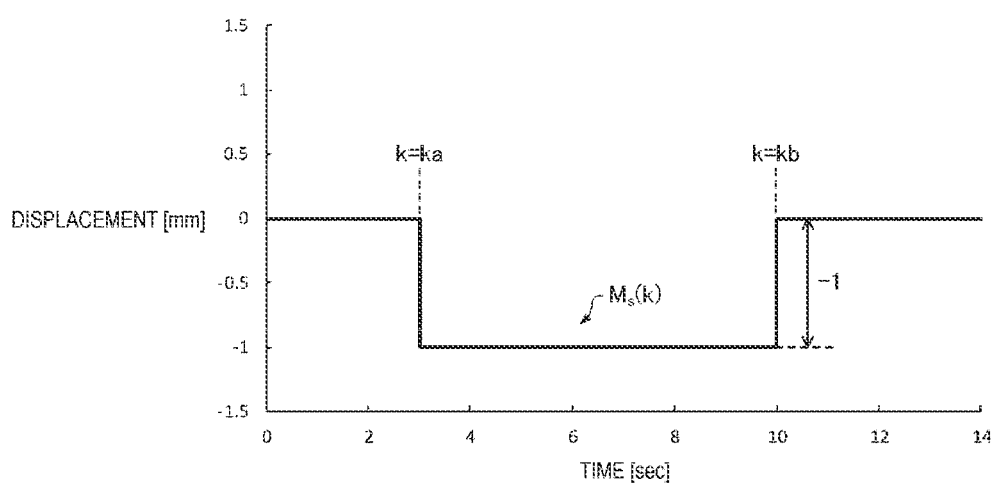
FIG. 8 is a diagram showing target data $M_s(k)$ which is a unit pulse waveform.

In Equation (8), k is an integer of 0 or more. FIG. 8 shows the displacement data $M_s(k)$, which is a unit pulse waveform expressed by Equation (8).

$$M_s(k) = \begin{cases} 0 & k < k_a, k_b < k \\ -1 & k_a \le k \le k_b \end{cases} \tag{8}$$

It is assumed that the relationship of the target data $M_s(k)$, the data $f_{HP}(M_s(k))$ obtained by performing high-pass filter processing on the target data $M_s(k)$, and the data $f_{LP}(M_s(k))$ obtained by performing low-pass filter processing on the target data $M_s(k)$ is as shown in Equation (1). For example, when the low-pass filter processing is moving average processing, Equation (9) is obtained based on Equation (1). At this time, data k is located at a center of a moving average interval 2p+1.

$$f_{HP} = (M_s(k)) = M_s(k) - f_{LP}(M_s(k)) = M_s(k) - \frac{1}{2p+1} \sum_{n=k-p}^{n=k+p} M_s(n) \tag{9}$$

Figure 9:
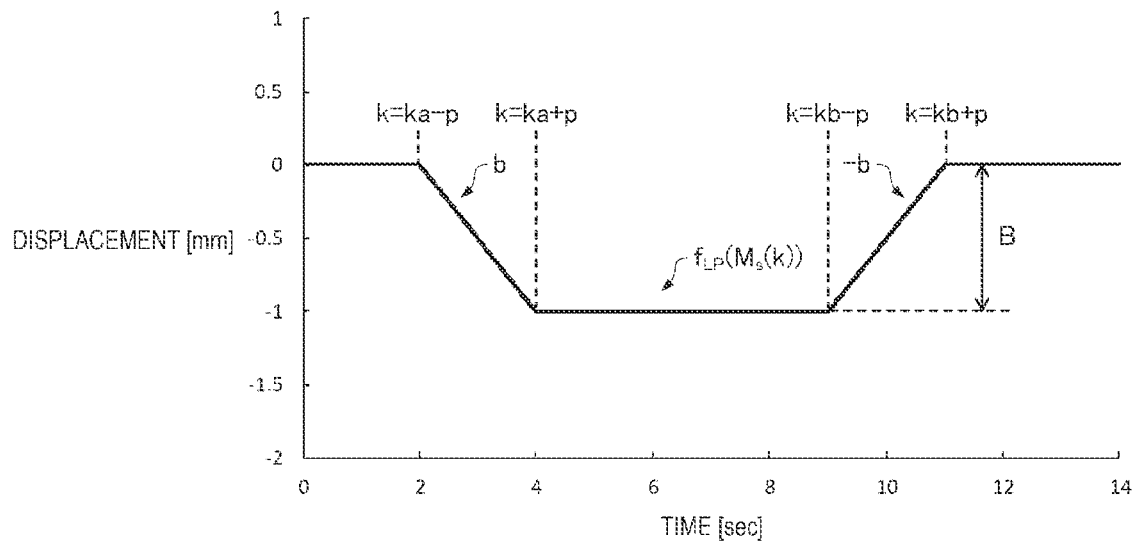
FIG. 9 is a diagram showing data $f_{LP}(M_s(k))$ obtained by performing low-pass filter processing on the target data $M_s(k)$.
Figure 10:
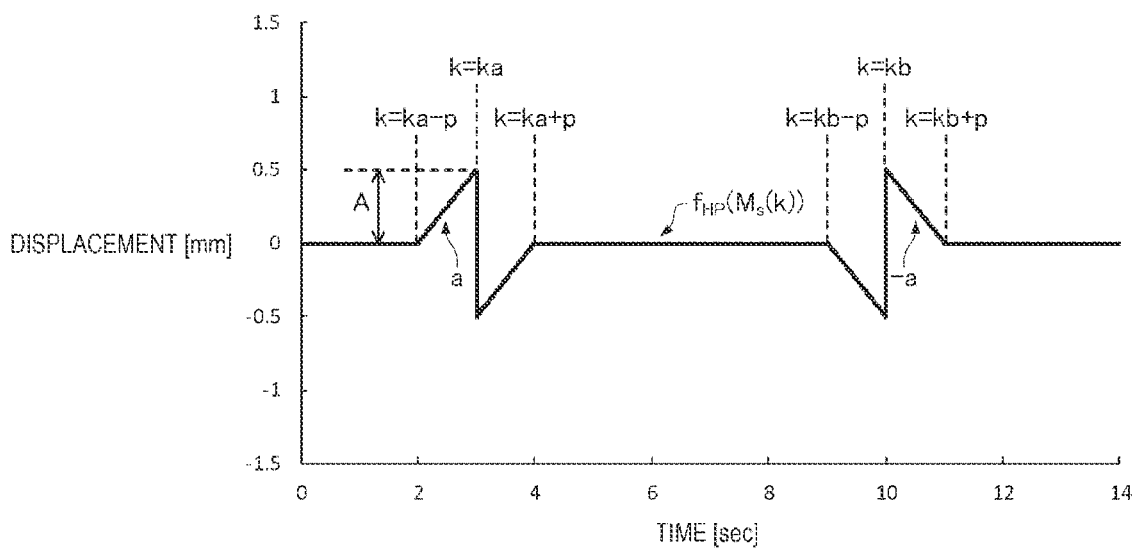
FIG. 10 is a diagram showing data $f_{HP}(M_s(k))$ obtained by performing high-pass filter processing on the target data $M_s(k)$.

In Equation (9), p is an integer of 1 or more, and since it is desired to provide a flat portion in the data $f_{LP}(M_s(k))$ obtained by performing low-pass filter processing on the target data $M_s(k)$, $p < (k_a - k_b)/2$ is satisfied. FIG. 9 shows the data $f_{LP}(M_s(k))$ obtained by performing low-pass filter processing, which is moving average processing, on the target data $M_s(k)$ which is a unit pulse waveform represented by Equation (8). FIG. 10 shows the data $f_{HP}(M_s(k))$ obtained by performing high-pass filter processing on the target data $M_s(k)$ which is a unit pulse waveform represented by Equation (8).

With reference to FIGS. 9 and 10, the data $f_{HP}(M_s(k))$ obtained by performing high-pass filter processing on the displacement data $M_s(k)$ which is a unit pulse waveform is compared with the data $f_{LP}(M_s(k))$ obtained by performing low-pass filter processing on the target data $M_s(k)$.

As shown in FIG. 9, a slope b of an interval from $k_a - p$ to $k_a + p$ of the data $f_{LP}(M_s(k))$ obtained by performing low-pass filter processing on the target data $M_s(k)$ is calculated by Equation (10).

$$b = f_{LP}(M_s(k_a + 1)) - f_{LP}(M_s(k_a)) = \tag{10}$$

$$\frac{1}{2p+1} \sum_{n=k_a+1-p}^{n=k_a+1+p} M_s(n) - \frac{1}{2p+1} \sum_{n=k_a-p}^{n=k_a+p} M_s(n) = \frac{-1}{2p+1}$$

A slope of an interval from $k_b - p$ to $k_b + p$ of the data $f_{LP}(M_s(k))$ is $-b$, and an amplitude B of the interval from $k_a + p$ to $k_b - p$ is $-1$.

On the other hand, as shown in FIG. 10, a slope a of an interval from $k_a - p$ to $k_a$ of the data $F_{HP}(M_s(k))$ obtained by performing high-pass filter processing on the target data $M_s(k)$ is calculated by Equation (11).

$$a = f_{HP}(M_s(k)) = M_s(k) - f_{LP}(M_s(k)) = \frac{1}{2p+1} \tag{11}$$

A slope of an interval from $k_b$ to $k_b+p$ of the data $f_{HP}(M_s(k))$ is $-a$, and an amplitude A of $k=k_a-1$ is calculated by Equation (12).

$$A = f_{HP}(M_s(k_a - 1)) = M_s(k_a - 1) - f_{LP}(M_s(k_a - 1)) = \qquad (12)$$

$$M_s(k_a - 1) - \frac{1}{2p+1} \sum_{n=k_a-1-p}^{n=k_a-1+p} M_s(n)$$

By substituting Equation (8) into Equation (12), the amplitude A is calculated as in Equation (13).

$$A = 0 - \frac{1}{2p+1}\left(\sum_{n=k_a-1-p}^{n=k_a-1} M_s(n) + \sum_{n=k_a}^{n=k_a-1+p} M_s(n)\right) = \qquad (13)$$

$$-\frac{1}{2p+1}(0 + (p)(-1)) = \frac{p}{2p+1}$$

According to Equation (13), when p is sufficiently large, the amplitude A is ½.

Here, the unit pulse waveform represented by Equation (8) and assumed as the target data $M_s(k)$ does not include the drift noise $e(k)$. Therefore, the data $f_{LP}(M_s(k))$ obtained by performing low-pass filter processing on the target data $M_s(k)$ is equal to the data $f_{LP}(M(k))$ obtained by performing low-pass filter processing on the signal $M(k)$, according to Equation (3). Therefore, a comparison between the data $f_{HP}(M_s(k))$ and the data $f_{LP}(M_s(k))$ is a comparison between the data $f_{HP}(M_s(k))$ and the data $f_{LP}(M(k))$, and by measuring the slope a and the amplitude A of the data $f_{LP}(M_s(k))$, the data $f_{LP}(M(k))$ obtained by performing low-pass filter processing on the signal $M(k)$ in which the drift noise $e(k)$ is removed can be estimated based on the target data $M_s(k)$.

1-3. Details of Measurement Method

Actually, the target data $M_s(k)$ which is displacement data of the deflection when the railway vehicle 6 passes through the superstructure 7 of the bridge 5 includes data of a waveform that projects in a positive direction or a negative direction and is different from the unit pulse waveform, but the data $f_{LP}(M(k))$ obtained by performing low-pass filter processing on the signal $M(k)$ can be estimated based on the estimation method described above. For example, the waveform that projects in the positive direction or the negative direction is a rectangular waveform, a trapezoidal waveform, or a sine half-wave waveform.

First, the measurement device 1 integrates the acceleration data $A_s(k)$ output from the acceleration sensor to generate the velocity data $V_s(k)$ as in Equation (14), and further integrates the velocity data $V_s(k)$ to generate the target data $M_s(k)$ as in Equation (15). In Equation (14) and Equation (15), $\Delta T$ is a time interval of data.

$$V_s(k)=A_s(k)\Delta T+V_s(k-1) \qquad (14)$$

$$M_s(k)=V_s(k)\Delta T+M_s(k-1) \qquad (15)$$

Figure 11:
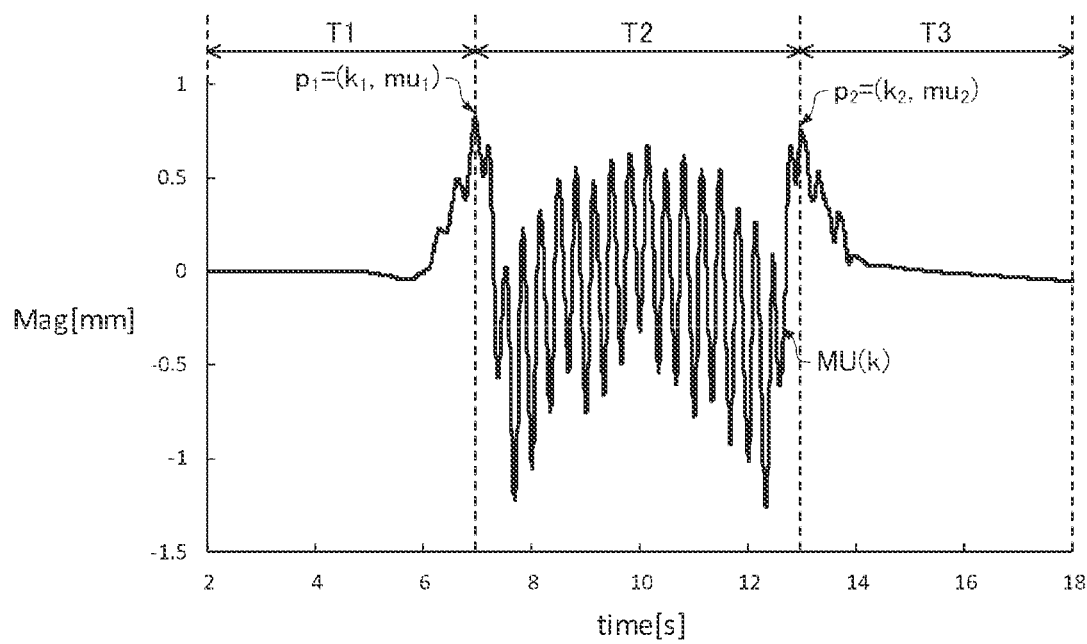
FIG. 11 is a diagram showing an example of displacement data $MU(k)$.

Next, the measurement device 1 generates the displacement data $MU(k)$, that is obtained by performing high-pass filter processing on the target data $M_s(k)$ in order to reduce the drift noise, as in Equation (16). FIG. 11 shows an example of the displacement data $MU(k)$.

$$MU(k)=f_{HP}(M_s(k)) \qquad (16)$$

Next, based on the displacement data $MU(k)$, the measurement device 1 estimates data $f_{LP}(M(k))$ obtained by performing low-pass filter processing on the signal $M(k)$, that is, correction data $M_{CC}(k)$ corresponding to a difference between the displacement data $MU(k)$ and data obtained by removing the drift noise from the target data $M_s(k)$.

As shown in FIG. 11, in the present embodiment, the measurement device 1 specifies a first interval T1, a second interval T2, and a third interval T3 based on the displacement data $MU(k)$, and generates correction data $M_{CC}(k)$ by dividing the correction data $M_{CC}(k)$ into these three intervals. In order to specify the first interval T1, the second interval T2, and the third interval T3, the measurement device 1 calculates a first peak $p_1=(k_1, mu_1)$, and a second peak $p_2=(k_2, mu_2)$ of the displacement data $MU(k)$. As shown in FIG. 11, the first peak $p_1$ is a head peak near a time point when the railway vehicle 6 enters the superstructure 7, and the second peak $p_2$ is a tail peak near a time point when the railway vehicle 6 exits the superstructure 7. The first interval T1 is an interval before the first peak $p_1$, that is, an interval of $k \le k_1$. The second interval T2 is the interval between the first peak $p_1$ and the second peak $p_2$, that is, an interval of $k_1 < k < k_2$. The third interval T3 is an interval after the second peak $p_2$, that is, an interval of $k_2 \le k$.

As shown in Equation (17), the correction data $M_{CC}(k)$ is obtained as a sum of first interval correction data $M_{CC1}(k)$ which is correction data of the first interval T1, second interval correction data $M_{CC1}(k)$ which is correction data of the second interval T2, and third interval correction data $M_{CC3}(k)$ which is correction data of the third interval T3.

$$M_{CC}(k)=M_{CC1}(k)+M_{CC2}(k)+M_{CC3}(k) \qquad (17)$$

Figure 12:
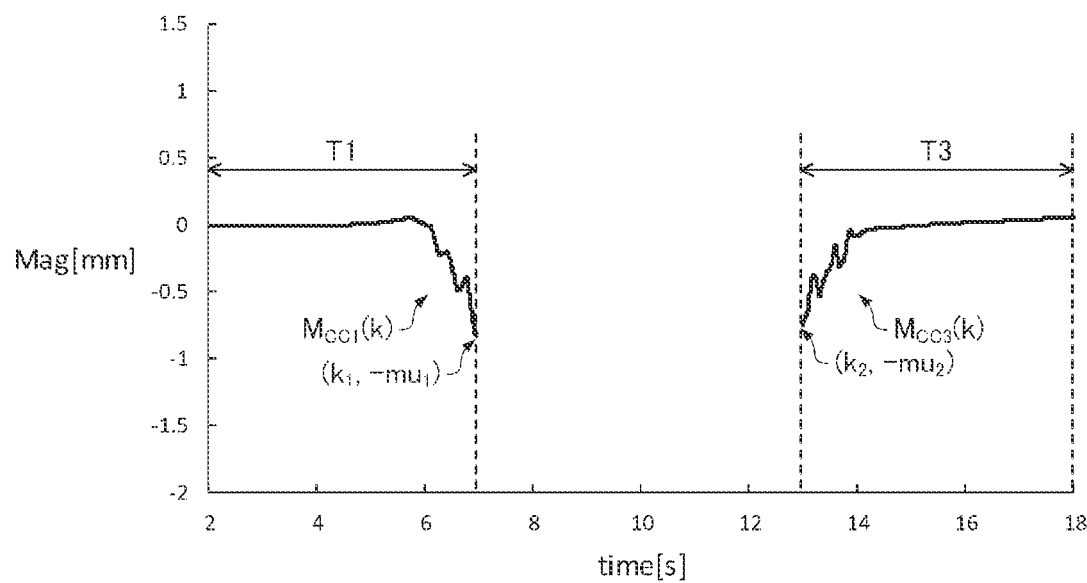
FIG. 12 is a diagram showing an example of first interval correction data $M_{CC1}(k)$ and third interval correction data $M_{CC3}(k)$.

The first interval correction data $M_{CC1}(k)$ is obtained according to Equation (18) using data $MU'(k)$ obtained by inverting a sign of the displacement data $MU(k)$. Similarly, the third interval correction data $M_{CC1}(k)$ is obtained according to Equation (19) using the data $MU'(k)$ obtained by inverting the sign of the displacement data $MU(k)$. FIG. 12 shows an example of the first interval correction data $M_{CC1}(k)$ and the third interval correction data $M_{CC3}(k)$.

$$M_{CC1}(k) = \begin{cases} k \le k_1 & MU'(k) \\ k_1 < k & 0 \end{cases} = \begin{cases} k \le k_1 & -MU(k) \\ k_1 < k & 0 \end{cases} \qquad (18)$$

$$M_{CC3}(k) = \begin{cases} k < k_2 & 0 \\ k_2 \le k & MU'(k) \end{cases} = \begin{cases} k < k_2 & 0 \\ k_2 \le k & -MU(k) \end{cases} \qquad (19)$$

The second interval correction data $M_{CC2}(k)$ is obtained as follows. First, in an interval of $k \le (k_1+k_2)/2$ at or before a predetermined time point of the second interval T2, data obtained by rearranging the displacement data $MU(k)$ before the first peak $p_1$ in a reverse order after the first peak $p_1$ is $MU(2k_1-k)$. Then, in an interval of $(k_1+k_2)/2 \le k$ at or after the predetermined time point of the second interval T2, data obtained by rearranging the displacement data $MU(k)$ after the second peak $p_2$ in a reverse order before the second peak $p_2$ is $MU(2k_2-k)$. Here, although the predetermined time point is a time point corresponding to $k=k_1+k_2$, the time point may be a time point other than that corresponding to $k=k_1+k_2$.

Figure 13:
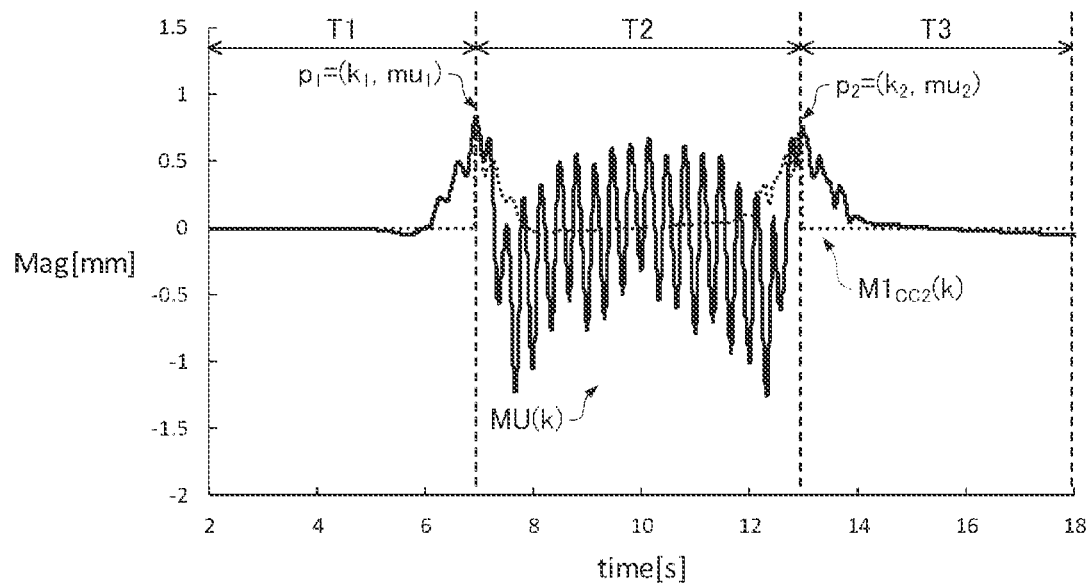
FIG. 13 shows an example of second interval first correction data $M1_{CC2}(k)$.

Then, second interval first correction data $M1_{CC2}(k)$ is obtained by using the data $MU(2k_1-k)$ and the data $MU(2k_2-k)$ according to Equation (20). FIG. 13 shows an example of the second interval first correction data $M1_{CC2}(k)$.

$$M1_{CC2}(k) = \begin{cases} k \le k_1 & 0 \\ k_1 < k \le \dfrac{k_1 + k_2}{2} & MU(2k_1 - k) \\ \dfrac{k_1 + k_2}{2} \le k < k_2 & MU(2k_2 - k) \\ k_2 \le k & 0 \end{cases} \quad (20)$$

Figure 14:
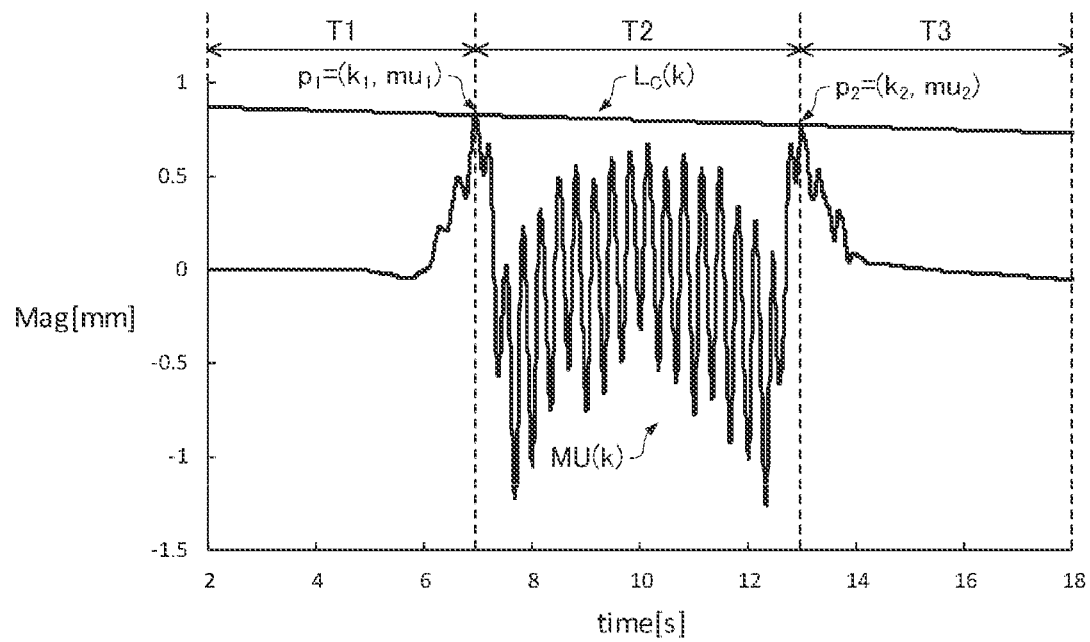
FIG. 14 is a diagram showing an example of line $L_C(k)$.

A line $L_C(k)$ passing through the first peak $p_1=(k_1, mu_1)$ and the second peak $p_2=(k_2, mu_2)$ is obtained by Equation (21). FIG. 14 shows an example of the line $L_C(k)$.

$$L_C(k) = \dfrac{mu_1 - mu_2}{k_1 - k_2} k + mu_1 - \dfrac{mu_1 - mu_2}{k_1 - k_2} k_1 \quad (21)$$

Figure 15:
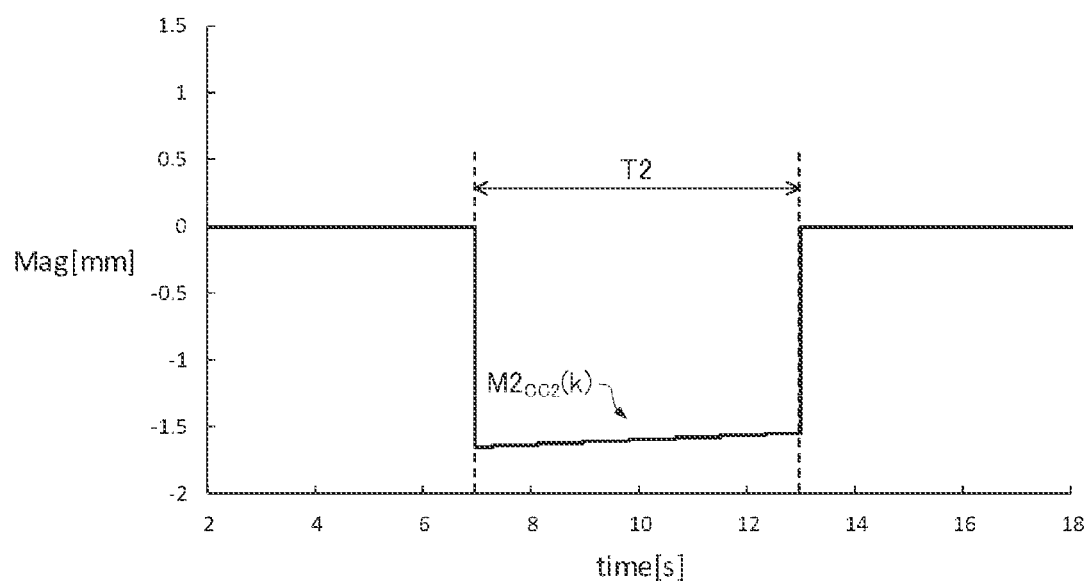
FIG. 15 shows an example of second interval second correction data $M2_{CC2}(k)$.

According to Equation (22), the second interval second correction data $M2_{CC2}(k)$ is obtained by using line data $-2L_C(k)$ obtained by multiplying the line $L_C(k)$ by $-2$. FIG. 15 shows an example of the second interval second correction data $M2_{CC2}(k)$.

$$M2_{CC2}(k) = \begin{cases} k \le k_1 & 0 \\ k_1 < k < k_2 & -2L_C(k) \\ k_2 \le k & 0 \end{cases} \quad (22)$$

As in Equation (23), the second interval correction data $M_{CC2}(k)$ is obtained as a sum of the second interval first correction data $M1_{CC2}(k)$ and the second interval second correction data $M2_{CC2}(k)$.

Figure 16:
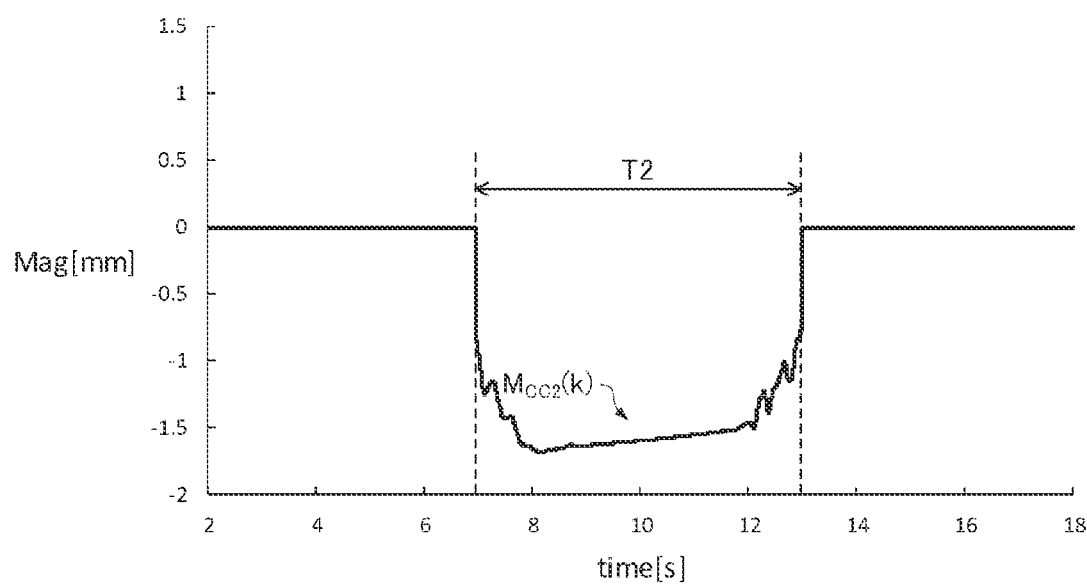
FIG. 16 is a diagram showing an example of second interval correction data $M_{CC2}(k)$.

FIG. 16 shows an example of the second interval correction data $M_{CC2}(k)$.

$$M_{CC2}(k) = M1_{CC2}(k) + M2_{CC2}(k) = \quad (23)$$
$$\begin{cases} k \le k_1 & 0 \\ k_1 < k \le \dfrac{k_1 + k_2}{2} & MU(2k_1 - k) - 2L_C(k) \\ \dfrac{k_1 + k_2}{2} \le k < k_2 & MU(2k_2 - k) - 2L_C(k) \\ k_2 \le k & 0 \end{cases}$$

Figure 17:
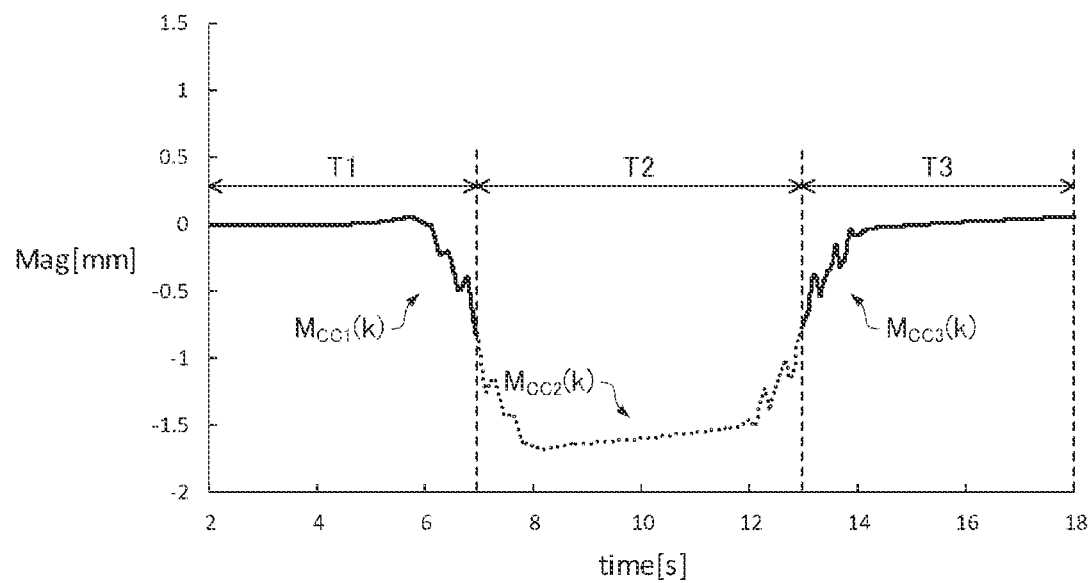
FIG. 17 is a diagram showing an example of the correction data $M_{CC}(k)$.

The correction data $M_{CC}(k)$ is obtained as in Equation (24) by substituting Equation (18), Equation (19), and Equation (23) into Equation (17). FIG. 17 shows an example of the correction data $M_{CC}(k)$.

$$M_{CC}(k) = M_{CC1}(k) + M_{CC2}(k) + M_{CC3}(k) = \quad (24)$$
$$\begin{cases} k \le k_1 & -MU(k) \\ k_1 < k \le \dfrac{k_1 + k_2}{2} & MU(2k_1 - k) - 2L_C(k) \\ \dfrac{k_1 + k_2}{2} \le k < k_2 & MU(2k_2 - k) - 2L_C(k) \\ k_2 \le k & -MU(k) \end{cases}$$

Then, as in Equation (25), the displacement data $MU(k)$ and the correction data $M_{CC}(k)$ are added to obtain the measurement data $RU(k)$ which is the displacement data in which the drift noise is reduced.

$$RU(k) = MU(k) + M_{CC}(k) \quad (25)$$

Equation (26) is obtained by substituting Equation (24) into Equation (25).

$$RU(k) = \begin{cases} k \le k_1 & 0 \\ k_1 < k \le \dfrac{k_1 + k_2}{2} & MU(k) + MU(2k_1 - k) - 2L_C(k) \\ \dfrac{k_1 + k_2}{2} \le k < k_2 & MU(k) + MU(2k_2 - k) - 2L_C(k) \\ k_2 \le k & 0 \end{cases} \quad (26)$$

Equation (26) is transformed into Equation (27).

$$RU(k) = \begin{cases} k \le k_1 & 0 \\ k_1 < k < k_2 & MU(k) + M_{CC}(k) \\ k_2 \le k & 0 \end{cases} \quad (27)$$

Figure 18:
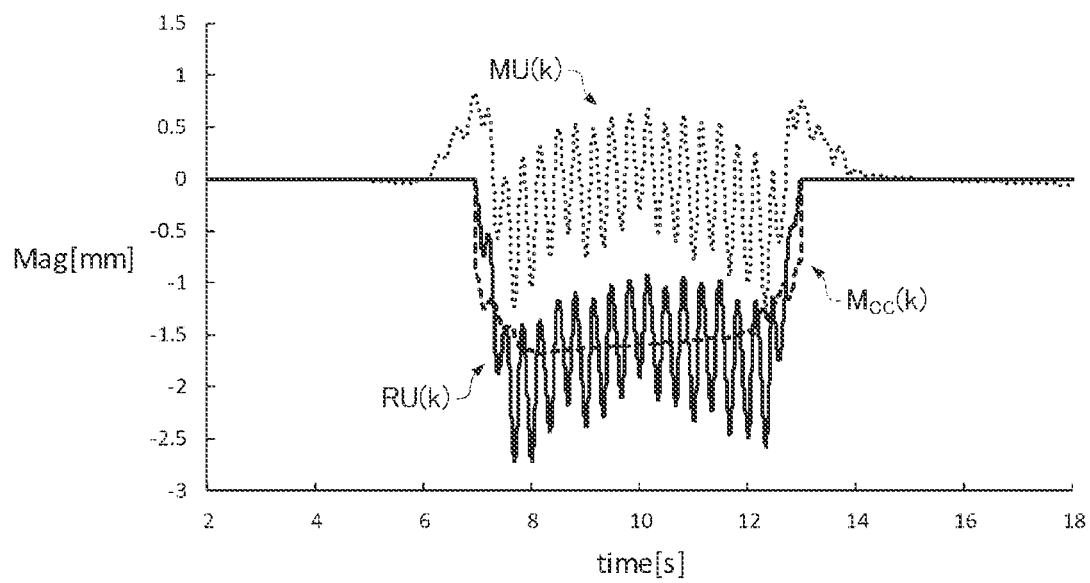
FIG. 18 is a diagram showing an example of measurement data $RU(k)$.

According to Equation (27), the measurement data $RU(k)$ is 0 in an interval of $k \le k_1$ which is the first interval T1 and an interval of $k_2 \le k$ which is the third interval T3, and the measurement data $RU(k)$ in which the drift noise is removed is obtained. FIG. 18 shows an example of the measurement data $RU(k)$.

Figure 19:
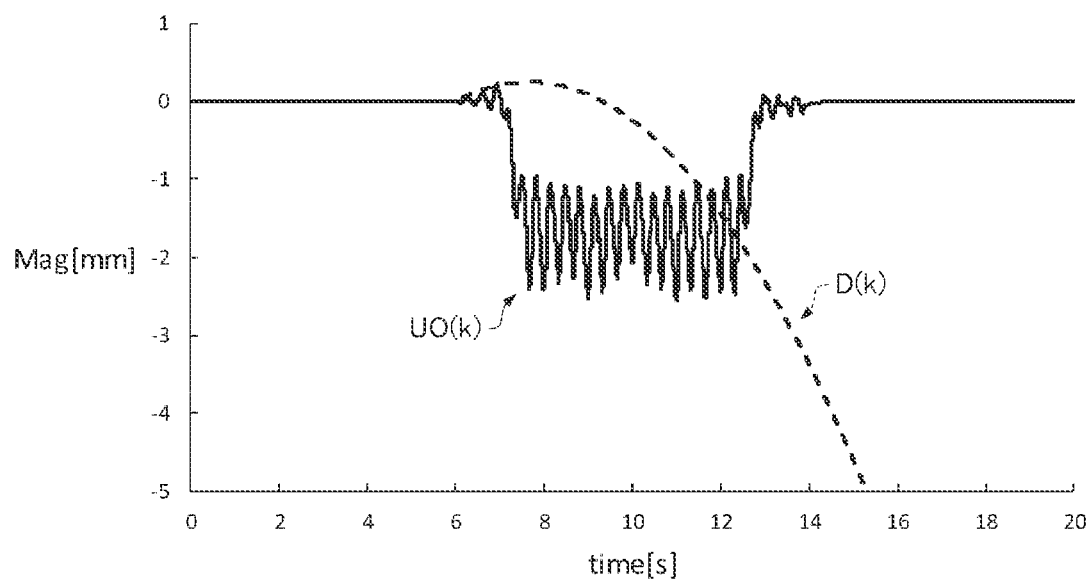
FIG. 19 is a diagram showing an example of displacement waveform $UO(k)$ and a drift noise $D(k)$.
Figure 20:
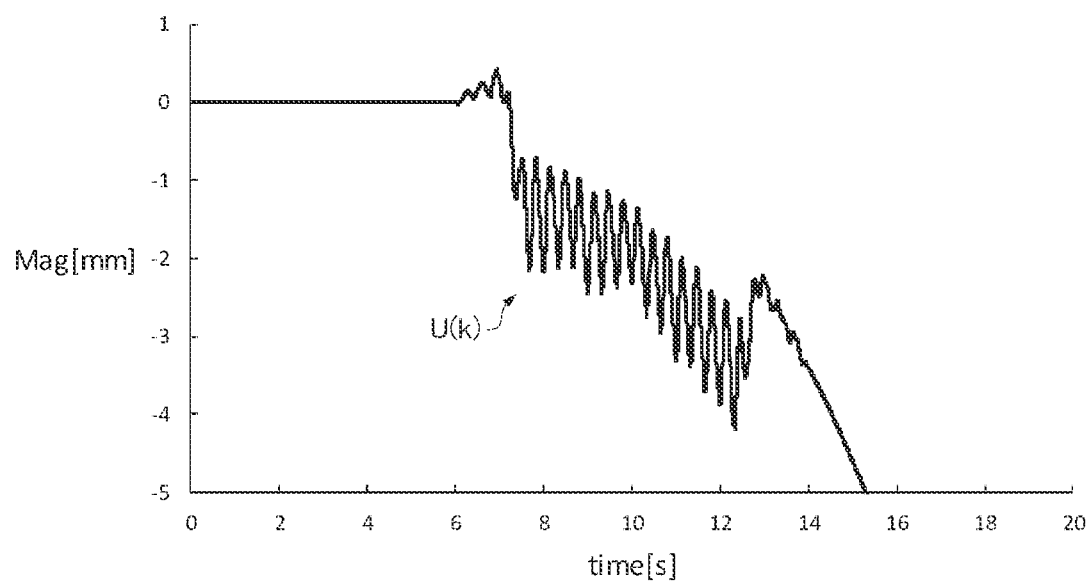
FIG. 20 is a diagram showing an example of an evaluation waveform $U(k)$.

In order to confirm an effect of removing the drift noise by the measurement method of the present embodiment, a waveform obtained by adding the drift noise $D(k)$ to a displacement waveform $UO(k)$ as in Equation (28) is used as an evaluation waveform $U(k)$. FIG. 19 shows an example of the displacement waveform $UO(k)$ and the drift noise $D(k)$. FIG. 20 shows an example of the evaluation waveform $U(k)$.

$$U(k) = UO(k) + D(k) \quad (28)$$

Figure 21:
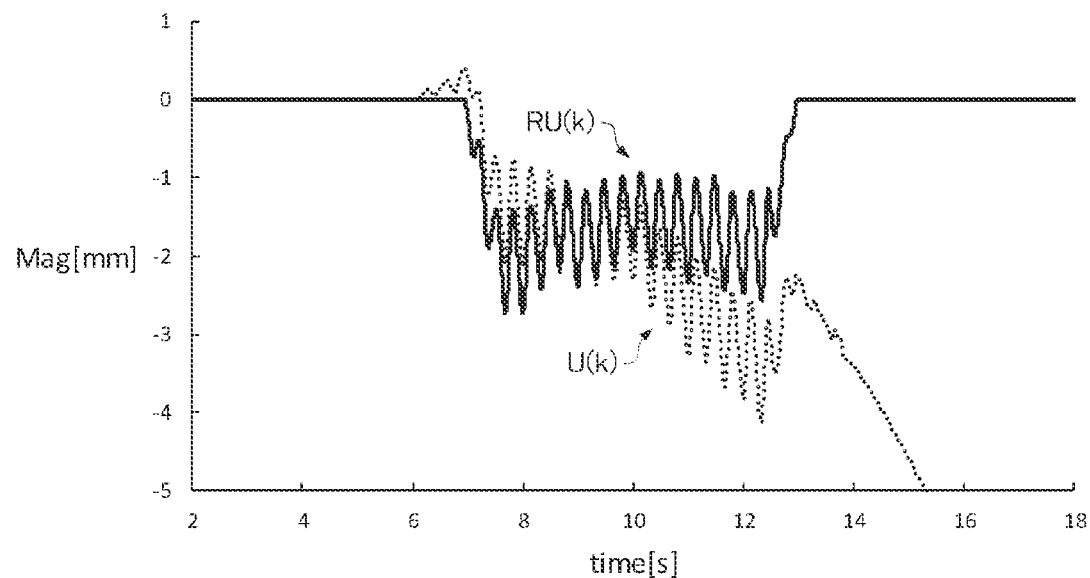
FIG. 21 is a diagram showing the measurement data $RU(k)$.
Figure 22:
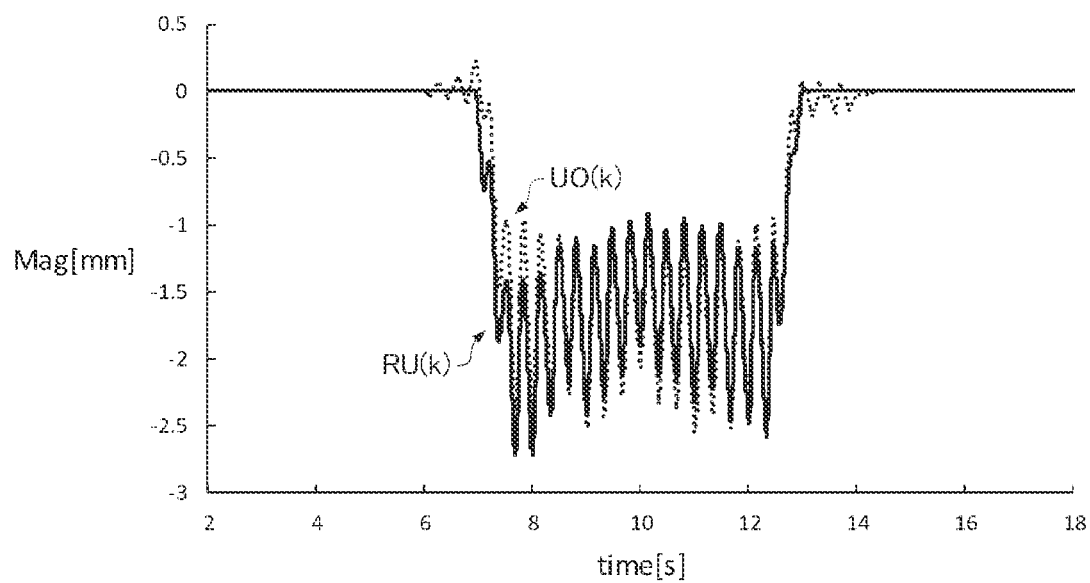
FIG. 22 is a diagram showing the measurement data $RU(k)$ and the displacement waveform $UO(k)$ in an overlapping manner.

Using the evaluation waveform $U(k)$ as the target data $M_s(k)$, the measurement data $RU(k)$ obtained by Equations (16) to (27) is compared with the displacement waveform $UO(k)$. FIG. 21 shows the measurement data $RU(k)$. FIG. 22 shows the measurement data $RU(k)$ and the displacement waveform $UO(k)$ in an overlapping manner. As shown in FIGS. 21 and 22, it can be confirmed that the measurement data $RU(k)$ in which the drift noise is removed and the displacement waveform is restored is obtained by the measurement method according to the present embodiment.

1-4. Procedure of Measurement Method

Figure 23:
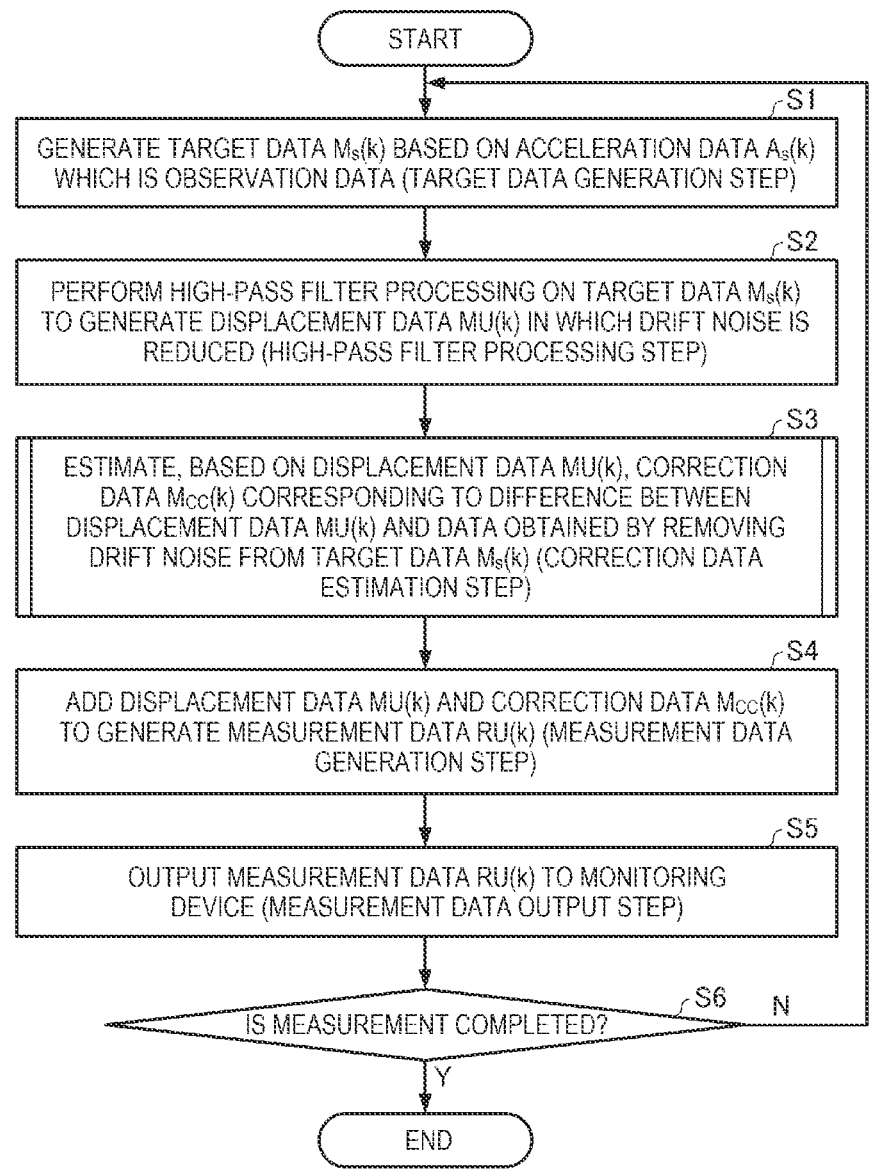
FIG. 23 is a flowchart showing an example of a procedure of a measurement method according to a first embodiment.

FIG. 23 is a flowchart showing an example of a procedure of the measurement method of the first embodiment for measuring the displacement of the superstructure 7 of the bridge 5. In the present embodiment, the measurement device 1 executes the procedure shown in FIG. 23.

As shown in FIG. 23, first, in a target data generation step S1, the measurement device 1 acquires the acceleration data $A_s(k)$ which is observation data, and generates the target data $M_s(k)$. Therefore, the target data $M_s(k)$ is data based on the acceleration data $A_s(k)$ which is observation data from the sensor 2 which is the observation device. Specifically, the measurement device 1 generates the target data $M_s(k)$ by performing the calculations of Equations (14) and (15) described above. In the present embodiment, the target data $M_s(k)$ to be processed is data of the displacement of the superstructure 7 caused by the railway vehicle 6 which is a moving object moving on the superstructure 7 which is a structure, and is data obtained by integrating twice the acceleration in a direction intersecting a surface of the superstructure 7 on which the railway vehicle 6 moves. Therefore, the target data $M_s(k)$ includes data of a waveform that projects in the positive direction or the negative direction, specifically, a rectangular waveform, a trapezoidal waveform, or a sine half-wave waveform.

The rectangular waveform includes not only an accurate rectangular waveform but also a waveform approximate to the rectangular waveform. Similarly, the trapezoidal waveform includes not only an accurate trapezoidal waveform but also a waveform approximate to the trapezoidal waveform. Similarly, the sine half-wave waveform includes not only an accurate sine half-wave waveform but also a waveform approximate to the sine half-wave waveform.

Next, in a high-pass filter processing step S2, the measurement device 1 performs high-pass filter processing on the target data $M_s(k)$ including the drift noise and generated in step S1, so as to generate the displacement data MU(k) as drift noise reduction data in which the drift noise is reduced, as in Equation (16). The high-pass filter processing of the target data $M_s(k)$ may be processing of subtracting data, that is obtained by performing low-pass filter processing on the target data $M_s(k)$, from the target data $M_s(k)$, as in Equation (9) above. The low-pass filter processing may be moving average processing or FIR filter processing. The FIR is an abbreviation for finite impulse response. That is, the high-pass filter processing of the target data $M_s(k)$ may be processing of subtracting data, that is obtained by performing moving average processing or FIR filter processing on the target data $M_s(k)$, from the target data $M_s(k)$. In the present embodiment, a frequency of the drift noise included in the target data $M_s(k)$ is lower than a minimum value of the natural vibration frequency of the superstructure 7. The minimum value of the natural vibration frequency of the superstructure 7 is, for example, a frequency of a first-order vibration mode in the longitudinal direction of the superstructure 7. By setting the cutoff frequency of the high-pass filter processing to be higher than the frequency of the drift noise of the superstructure 7 and lower than the minimum value of the natural vibration frequency, the drift noise in the generated displacement data MU(k) is reduced without reducing a signal component and a harmonic component of the natural vibration frequency of the superstructure 7. For example, the frequency of the drift noise may be less than 1 Hz, and the cutoff frequency of the high-pass filter processing may be 1 Hz or more.

Next, in a correction data estimation step S3, the measurement device 1 estimates, based on the displacement data MU(k) generated in step S2, the correction data $M_{CC}(k)$ corresponding to a difference between the displacement data MU(k) and the data obtained by removing the drift noise from the target data $M_s(k)$. Specifically, the measurement device generates the correction data $M_{CC}(k)$ by performing calculations of Equations (17) to (24).

Next, in a measurement data generation step S4, the measurement device 1 adds the displacement data MU(k) generated in step S2 and the correction data $M_{CC}(k)$ generated in step S3 to generate the measurement data RU(k), as in Equation (25).

Next, in a measurement data output step S5, the measurement device 1 outputs the measurement data RU(k) generated in step S4 to the monitoring device 3. Specifically, the measurement device 1 transmits the measurement data RU(k) to the monitoring device 3 via the communication network 4.

Then, in step S6, the measurement device 1 repeats the processing of steps S1 to S5 until the measurement of the displacement of the superstructure 7 of the bridge 5 is completed.

Figure 24:
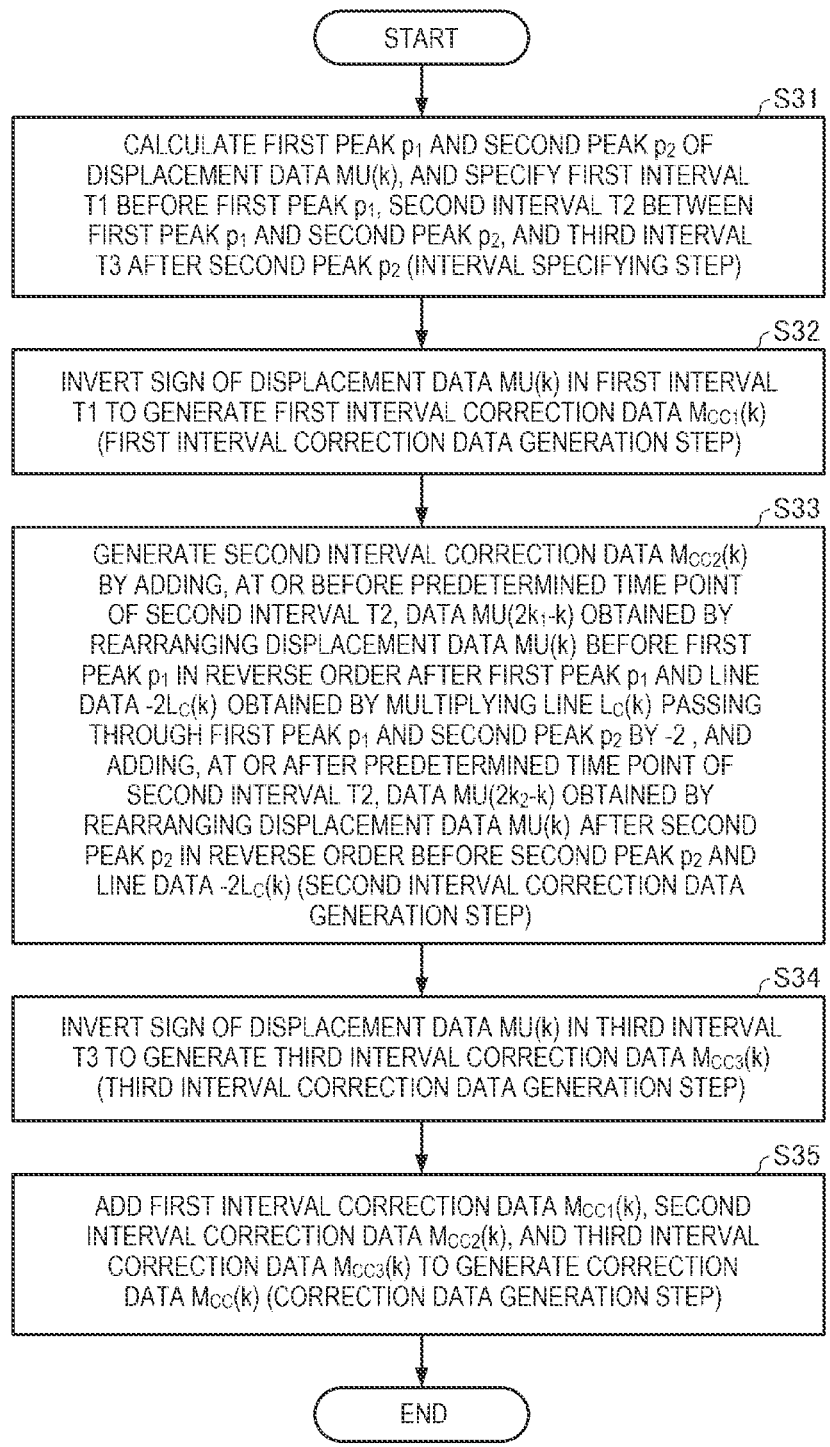
FIG. 24 is a flowchart showing an example of a procedure of a correction data estimation step in the first embodiment.

FIG. 24 is a flowchart showing an example of a procedure of the correction data estimation step S3 in FIG. 23.

As shown in FIG. 24, first, in an interval specifying step S31, the measurement device 1 calculates a first peak $p_1=(k_1, mu_1)$, and a second peak $p_2=(k_2, mu_2)$ of the displacement data MU(k), and specifies a first interval T1 before the first peak $p_1$, a second interval T2 between the first peak $p_1$ and the second peak $p_2$, and a third interval T3 after the second peak $p_2$. That is, the first interval T1 is an interval of $k \leq k_1$, the second interval T2 is an interval of $k_1 < k < k_2$, and the third interval T3 is an interval of $k_2 \leq k$. In the present embodiment, the first peak $p_1$ is the head peak near the time point when the railway vehicle 6 enters the superstructure 7, and the second peak $p_2$ is the tail peak near the time point when the railway vehicle 6 exits the superstructure 7.

Next, in a first interval correction data generation step S32, the measurement device 1 inverts the sign of the displacement data MU(k) in the first interval T1 to generate the first interval correction data $M_{CC1}(k)$, as in Equation (18).

Next, in a second interval correction data generation step S33, the measurement device 1 generates the second interval correction data $M_{CC1}(k)$ by adding, at or before the predetermined time point of the second interval T2, the data $MU(2k_1-k)$ obtained by rearranging the displacement data MU(k) before the first peak $p_1$ in the reverse order after the first peak $p_1$ and the line data $-2L_C(k)$ obtained by multiplying the line $L_C(k)$ passing through the first peak $p_1$ and the second peak $p_2$ by $-2$, and adding, at or after the predetermined time point of the second interval T2, the data $MU(2k_2-k)$ obtained by rearranging the displacement data MU(k) after the second peak $p_2$ in the reverse order before the second peak $p_2$ and the line data $-2L_C(k)$, as in Equation (23).

Next, in a third interval correction data generation step S34, the measurement device 1 inverts the sign of the displacement data MU(k) in the third interval T3 to generate the third interval correction data $M_{CC3}(k)$, as in Equation (19).

Finally, in a correction data generation step S35, the measurement device 1 adds the first interval correction data $M_{CC1}(k)$ generated in step S32, the second interval correction data $M_{CC2}(k)$ generated in step S33, and the third interval correction data $M_{CC3}(k)$ generated in step S34, as in Equation (17).

1-5. Configuration of Observation Device, Measurement Device, and Monitoring Device FIG. 25 is a diagram showing a configuration example of the sensor 2 which is the observation device, the measurement device 1, and the monitoring device 3.

Figure 25:
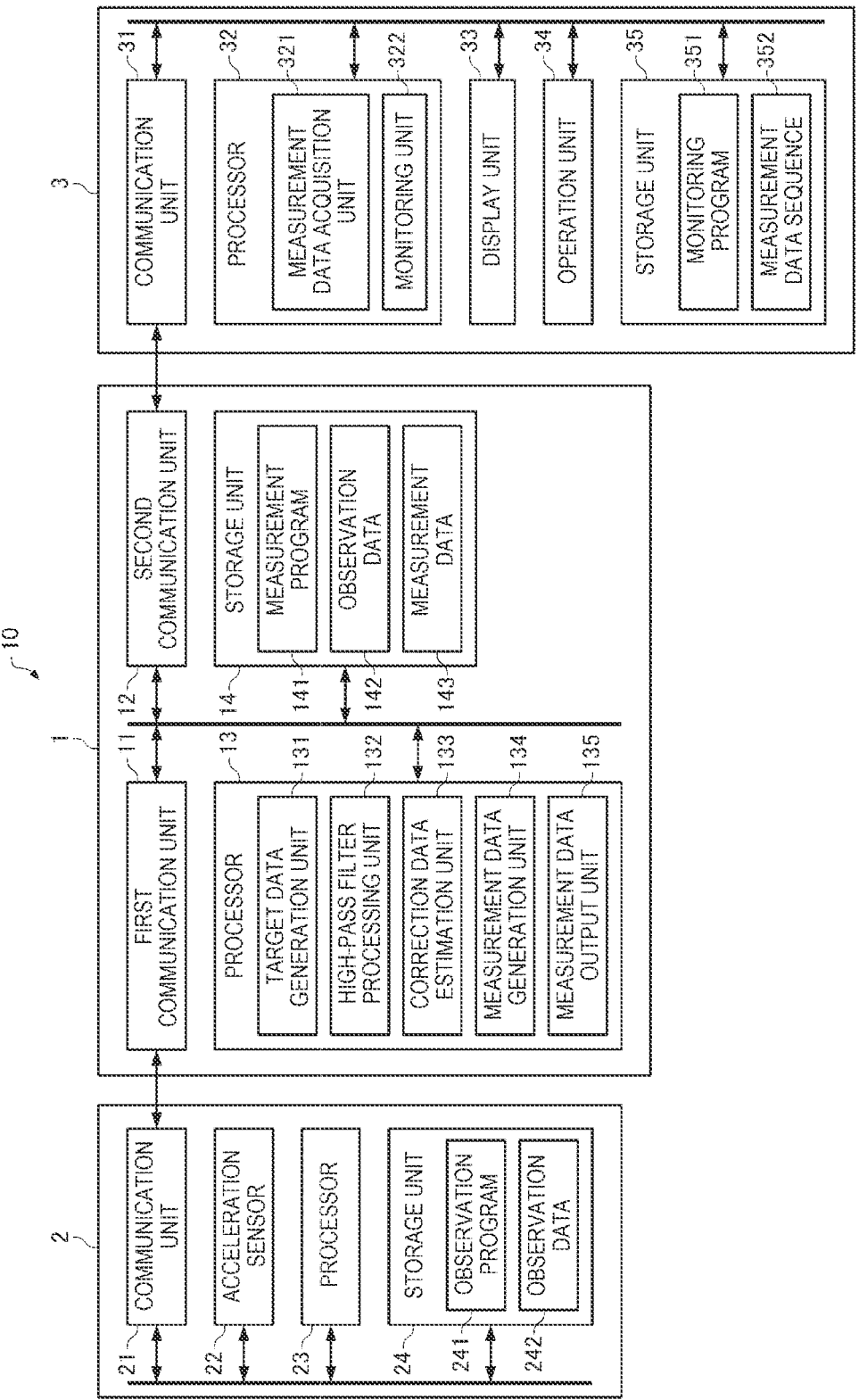
FIG. 25 is a diagram showing a configuration example of a sensor, a measurement device, and a monitoring device.

As shown in FIG. 25, the sensor 2 includes a communication unit 21, an acceleration sensor 22, a processor 23, and a storage unit 24.

The storage unit 24 is a memory that stores various programs, data, and the like for the processor 23 to perform calculation processing and control processing. The storage unit 24 stores programs, data, and the like for the processor 23 to implement predetermined application functions.

The acceleration sensor 22 detects an acceleration generated in each axial direction of the three axes.

The processor 23 controls the acceleration sensor 22 by executing an observation program 241 stored in the storage unit 24, generates observation data 242 based on the acceleration detected by the acceleration sensor 22, and stores the generated observation data 242 in the storage unit 24. In the present embodiment, the observation data 242 is the acceleration data $A_s(k)$.

The communication unit 21 transmits the observation data 242 stored in the storage unit 24 to the measurement device 1 under the control of the processor 23.

As shown in FIG. 25, the measurement device 1 includes a first communication unit 11, a second communication unit 12, a processor 13, and a storage unit 14.

The first communication unit 11 receives the observation data 242 from the sensor 2, and outputs the received observation data 242 to the processor 13. As described above, the observation data 242 is the acceleration data $A_s(k)$.

The storage unit 14 is a memory that stores programs, data, and the like for the processor 13 to perform the calculation processing and the control processing. The storage unit 14 stores programs, data, and the like for the processor 13 to implement predetermined application functions. The processor 13 may receive various programs, data, and the like via the communication network 4 and store the programs, data, and the like in the storage unit 14.

The processor 13 acquires the observation data 242 received by the first communication unit 11, and stores the observation data 242 in the storage unit 14 as observation data 142. Then, the processor 13 generates measurement data 143 based on the observation data 142 stored in the storage unit 14, and stores a generated measurement data 143 in the storage unit 14. In the present embodiment, the measurement data 143 is the measurement data RU(k).

In the present embodiment, the processor 13 functions as a target data generation unit 131, a high-pass filter processing unit 132, a correction data estimation unit 133, a measurement data generation unit 134, and a measurement data output unit 135 by executing a measurement program 141 stored in the storage unit 14. That is, the processor 13 includes the target data generation unit 131, the high-pass filter processing unit 132, the correction data estimation unit 133, the measurement data generation unit 134, and the measurement data output unit 135.

The target data generation unit 131 reads the observation data 142 stored in the storage unit 14, and generates the target data $M_s(k)$ based on the acceleration data $A_s(k)$ that is the observation data 142. Specifically, the target data generation unit 131 generates the target data $M_s(k)$ by performing calculations of Equations (14) and (15). That is, the target data generation unit 131 performs the processing of the target data generation step S1 in FIG. 23.

The high-pass filter processing unit 132 performs high-pass filter processing on the target data $M_s(k)$, that includes the drift noise and is generated by the target data generation unit 131, to generate the displacement data MU(k) as drift noise reduction data in which the drift noise is reduced, as in Equation (16). That is, the high-pass filter processing unit 132 performs the processing of the high-pass filter processing step S2 in FIG. 23.

The correction data estimation unit 133 generates, based on the displacement data MU(k) generated by the high-pass filter processing unit 132, the correction data $M_{CC}(k)$ corresponding to the difference between the displacement data MU(k) and the data obtained by removing the drift noise from the target data $M_s(k)$. The correction data estimation unit 133 generates the correction data $M_{CC}(k)$ by performing calculations of Equations (17) to (24).

Specifically, first, the correction data estimation unit 133 calculates the first peak $p_1 = mu_1$) and the second peak $p_2 = (k_2, mug)$ of the displacement data MU(k), and specifies the first interval T1 before the first peak $p_1$, the second interval T2 between the first peak $p_1$ and the second peak $p_2$, and the third interval T3 after the second peak $p_2$. That is, the correction data estimation unit 133 performs the processing of the interval specifying step S31 in FIG. 24.

Next, the correction data estimation unit 133 inverts the sign of the displacement data MU(k) in the first interval T1 to generate the first interval correction data $M_{CC1}(k)$, as in Equation (18). That is, the correction data estimation unit 133 performs the processing of the first interval correction data generation step S32 in FIG. 24.

Next, the correction data estimation unit 133 generates the second interval correction data $M_{CC1}(k)$ by adding, at or before the predetermined time point of the second interval T2, the data $MU(2k_1-k)$ obtained by rearranging the displacement data MU(k) before the first peak $p_1$ in the reverse order after the first peak $p_1$ and the line data $-2L_C(k)$ obtained by multiplying the line $L_C(k)$ passing through the first peak $p_1$ and the second peak $p_2$ by $-2$, and adding, at or after the predetermined time point of the second interval T2, the data $MU(2k_2-k)$ obtained by rearranging the displacement data MU(k) after the second peak $p_2$ in the reverse order before the second peak $p_2$ and the line data $2L_C(k)$, as in Equation (23). That is, the correction data estimation unit 133 performs the processing of the second interval correction data generation step S33 in FIG. 24.

Next, the correction data estimation unit 133 inverts the sign of the displacement data MU(k) in the third interval T3 to generate the third interval correction data $M_{CC1}(k)$, as in Equation (19). That is, the correction data estimation unit 133 performs the processing of the third interval correction data generation step S34 in FIG. 24.

Finally, the correction data estimation unit 133 adds the first interval correction data $M_{CC1}(k)$, the second interval correction data $M_{CC1}(k)$, and the third interval correction data $M_{CC1}(k)$ to generate the correction data $M_{CC}(k)$, as in the above Equation (17). That is, the correction data estimation unit 133 performs the processing of the correction data generation step S35 in FIG. 24.

As described above, the correction data estimation unit 133 performs the processing of the correction data estimation step S3 in FIG. 23, specifically, the processing of steps S31 to S35 in FIG. 24.

The measurement data generation unit 134 generates the measurement data RU(k) by adding the displacement data MU(k) generated by the high-pass filter processing unit 132 and the correction data $M_{CC}(k)$ generated by the correction data estimation unit 133, as in Equation (25). That is, the measurement data generation unit 134 performs the processing of the measurement data generation step S4 in FIG. 23. The measurement data RU(k) generated by the measurement data generation unit 134 is stored in the storage unit 14 as the measurement data 143.

The measurement data output unit 135 reads the measurement data 143 stored in the storage unit 14 and outputs the measurement data 143 to the monitoring device 3. Then, the second communication unit 12 transmits the measurement data 143 stored in the storage unit 14 to the monitoring device 3 via the communication network 4 under the control of the measurement data output unit 135. That is, the measurement data output unit 135 performs the processing of the measurement data output step S5 in FIG. 23.

As described above, the measurement program 141 is a program that causes the measurement device 1, which is a computer, to execute each procedure of the flowchart shown in FIG. 23.

As shown in FIG. 25, the monitoring device 3 includes a communication unit 31, a processor 32, a display unit 33, an operation unit 34, and a storage unit 35.

The communication unit 31 receives the measurement data 143 from the measurement device 1 and outputs the received measurement data 143 to the processor 32. As described above, the measurement data 143 is the measurement data RU(k).

The display unit 33 displays various types of information under the control of the processor 32. The display unit 33 may be, for example, a liquid crystal display or an organic EL display. The EL is an abbreviation for Electro Luminescence.

The operation unit 34 outputs operation data corresponding to an operation of a user to the processor 32. The operation unit 34 may be, for example, an input device such as a mouse, a keyboard, or a microphone.

The storage unit 35 is a memory that stores various programs, data, and the like for the processor 32 to perform calculation processing and control processing. The storage unit 35 stores programs, data, and the like for the processor 32 to implement predetermined application functions.

The processor 32 acquires the measurement data 143 received by the communication unit 31, generates evaluation information by evaluating a temporal change in the displacement of the superstructure 7 based on the acquired measurement data 143, and displays the generated evaluation information on the display unit 33.

In the present embodiment, the processor 32 functions as a measurement data acquisition unit 321 and a monitoring unit 322 by executing a monitoring program 351 stored in the storage unit 35. That is, the processor 32 includes the measurement data acquisition unit 321 and the monitoring unit 322.

The measurement data acquisition unit 321 acquires the measurement data 143 received by the communication unit 31, and adds the acquired measurement data 143 to a measurement data sequence 352 stored in the storage unit 35.

The monitoring unit 322 statistically evaluates the temporal change in the displacement of the superstructure 7 based on the measurement data sequence 352 stored in the storage unit 35. Then, the monitoring unit 322 generates evaluation information indicating the evaluation result, and displays the generated evaluation information on the display unit 33. The user can monitor a state of the superstructure 7 based on the evaluation information displayed on the display unit 33.

The monitoring unit 322 may perform processing such as monitoring of the railway vehicle 6 and abnormality determination of the superstructure 7 based on the measurement data sequence 352 stored in the storage unit 35.

The processor 32 transmits, based on the operation data output from the operation unit 34, information for adjusting operation states of the measurement device 1 and the sensor 2 to the measurement device 1 via the communication unit 31. The operation state of the measurement device 1 is adjusted according to the information received via the second communication unit 12. In addition, the measurement device 1 transmits information for adjusting the operation state of the sensor 2 received via the second communication unit 12 to the sensor 2 via the first communication unit 11. The operation state of the sensor 2 is adjusted according to the information received via the communication unit 21.

In the processors 13, 23, and 32, for example, the functions of the respective units may be implemented by individual hardware, or the functions of the respective units may be implemented by integrated hardware. For example, the processors 13, 23, and 32 include hardware, and the hardware may include at least one of a circuit that processes a digital signal and a circuit that processes an analog signal. The processors 13, 23, and 32 may be a CPU, a GPU, a DSP, or the like. The CPU is an abbreviation for central processing unit, the GPU is an abbreviation for graphics processing unit, and the DSP is an abbreviation for digital signal processor. The processors 13, 23, and 32 may be configured as custom ICs such as ASICs so as to implement the functions of the respective units, or may implement the functions of the respective units by a CPU and an ASIC. The ASIC is an abbreviation for application specific integrated circuit, and the IC is an abbreviation for integrated circuit.

The storage units 14, 24, and 35 are configured by, for example, various IC memories such as a ROM, a flash ROM, and a RAM, and a recording medium such as a hard disk, a memory card, and the like. ROM is an abbreviation for read only memory, RAM is an abbreviation for random access memory, and IC is an abbreviation for integrated circuit. The storage units 14, 24, and 35 include a non-volatile information storage device that is a computer-readable device or a medium, and various programs, data, and the like may be stored in the information storage device. The information storage device may be an optical disk such as an optical disk DVD or a CD, a hard disk drive, or various memories such as a card type memory or a ROM.

Although only one sensor 2 is shown in FIG. 25, a plurality of sensors 2 may generate the observation data 242 and transmit the observation data 242 to the measurement device 1. In this case, the measurement device 1 receives a plurality of pieces of the observation data 242 transmitted from the plurality of sensors 2, generates a plurality of pieces of measurement data 143, and transmits the plurality of pieces of measurement data 143 to the monitoring device 3. The monitoring device 3 receives the plurality of pieces of measurement data 143 transmitted from the measurement device 1, and monitors a plurality of states of the superstructures 7 based on the plurality of pieces of received measurement data 143.

1-6. Operation and Effect

In the measurement method of the first embodiment described above, the measurement device 1 generates the displacement data MU(k), in which the drift noise is reduced, using the target data $M_s(k)$ to be processed, and estimates the correction data $M_{CC}(k)$ based on the displacement data MU(k). Further, since the correction data $M_{CC}(k)$ corresponds to the difference between the displacement data MU(k) and the data obtained by subtracting the drift noise from the displacement data $M_s(k)$, the correction data $M_{CC}(k)$ includes the significant signal component removed by high-pass filter processing. Therefore, according to the measurement method of the first embodiment, the measurement device 1 can generate the measurement data RU(k), in which drift noise with respect to the target data $M_s(k)$ is reduced, by adding the displacement data MU(k) and the correction data $M_{CC}(k)$. According to the measurement method of the first embodiment, the measurement device 1 generates the displacement data MU(k) and the correction data $M_{CC}(k)$ using the target data $M_s(k)$ to be processed, adds the displacement data MU(k) and the correction data $M_{CC}(k)$, and thereby the measurement device 1 can generate the measurement data RU(k), in which the drift noise is reduced, without preparing information for reducing the drift noise in advance. Therefore, by using the measurement method of the first embodiment, accurate measurement data RU(k) can be obtained regardless of a change in environment, and cost reduction can be achieved.

According to the measurement method of the first embodiment, since the measurement device 1 can specify the first interval T1, the second interval T2, and the third interval T3, and can generate the appropriate first interval correction data $M_{CC_1}(k)$, second interval correction data $M_{CC_2}(k)$, and third interval correction data $M_{CC_1}(k)$ based on a feature of the displacement data MU(k) in which the drift noise is reduced with respect to the target data $M_s(k)$, it is possible to improve the estimation accuracy of the correction data $M_{CC}(k)$ generated by adding the first interval correction data $M_{CC_1}(k)$, the second interval correction data $M_{CC_2}(k)$, and the third interval correction data $M_{CC_3}(k)$. According to the measurement method of the first embodiment, the measurement device 1 performs processing of subtracting the data, that is obtained by performing moving average processing or FIR filter processing on the target data $M_s(k)$, from the target data $M_s(k)$ as the high-pass filter processing to be performed on the target data $M_s(k)$, and thus the high-pass filter processing can be easily performed. Further, in the moving average processing or the FIR filter processing, since a group delay of each signal component included in the target data $M_s(k)$ is constant, the correction data $M_{CC}(k)$ can be estimated with high accuracy.

In the measurement method of the first embodiment, the target data $M_s(k)$ to be processed is data of the displacement of the superstructure 7 caused by the railway vehicle 6 moving on the superstructure 7 of the bridge 5. Therefore, according to the measurement method of the first embodiment, since the measurement device 1 generates the measurement data RU(k) which is the data of the displacement of the superstructure 7 caused by the movement of the railway vehicle 6 and in which the drift noise is reduced, it is possible to accurately measure the displacement of the superstructure 7 of the bridge 5.

According to the measurement method of the first embodiment, since the measurement device 1 generates the target data $M_s(k)$ to be processed obtained by twice integrating the acceleration in the direction intersecting the surface of the superstructure 7 detected by the sensor 2 installed in the superstructure 7, it is possible to accurately measure the displacement of the superstructure 7.

In the measurement method of the first embodiment, since the frequency of the drift noise included in the target data $M_s(k)$ is lower than the minimum value of the natural vibration frequency of the superstructure 7, the cutoff frequency of the high-pass filter processing for the target data $M_s(k)$ can be set higher than the frequency of the drift noise of the superstructure 7 and lower than the minimum value of the natural vibration frequency. Therefore, according to the measurement method of the first embodiment, the drift noise can be reduced without reducing the signal component and the harmonic component of the natural vibration frequency of the superstructure 7 in the generated measurement data RU(k).

In the measurement method of the first embodiment, since the target data $M_s(k)$ to be processed includes data of a waveform that projects in the positive direction or the negative direction, for example, data of a rectangular waveform, a trapezoidal waveform, or a sine half-wave waveform, the measurement device 1 can generate more appropriate correction data $M_{CC}(k)$ based on features of these waveforms, so that it is possible to improve the estimation accuracy of the generated correction data $M_{CC}(k)$.

2. Second Embodiment

Hereinafter, in a second embodiment, the same components as those in the first embodiment will be denoted by the same reference numerals, repetitive description as that in the first embodiment will be omitted or simplified, and contents different from those in the first embodiment will be mainly described.

In the measurement method of the first embodiment, the measurement device 1 generates the correction data $M_{CC}(k)$ by adding the first interval correction data $M_{CC_1}(k)$, the second interval correction data $M_{CC_2}(k)$, and the third interval correction data $M_{CC_3}(k)$, and generates the measurement data RU(k) by adding the displacement data MU(k), and the correction data $M_{CC}(k)$. On the other hand, the measurement data RU(k) obtained by adding the displacement data MU(k) and the correction data $M_{CC}(k)$ as in Equation (27) is always 0 in the first interval T1 and the third interval T3. Therefore, in a measurement method of the second embodiment, the measurement device 1 generates the correction data $M_{CC_2}(k)$ in the second interval T2 without generating the first interval correction data $M_{CC_1}(k)$ and the third interval correction data $M_{CC_3}(k)$. Then, as shown in Equation (29), the measurement device 1 generates the measurement data RU(k) by setting, as 0, data in the interval of $k \le k_1$ which is the first interval T1 and data in the interval of $k_2 \le k$ which is the third interval T3, and adding the displacement data MU(k) and the correction data $M_{CC_2}(k)$ in the interval of $k_1 < k < k_2$ which is the second interval T2.

$$RU(k) = \begin{cases} k \le k_1 & 0 \\ k_1 < k < k_2 & MU(k) + M_{CC_2}(k) \\ k_2 \le k & 0 \end{cases} \quad (29)$$

In Equation (27), since the correction data $M_{CC}(k)$ matches the second interval correction data $M_{CC_2}(k)$ in the interval of $k_1 < k < k_2$, a calculation result of Equation (29) matches a calculation result of Equation (27).

Figure 26:
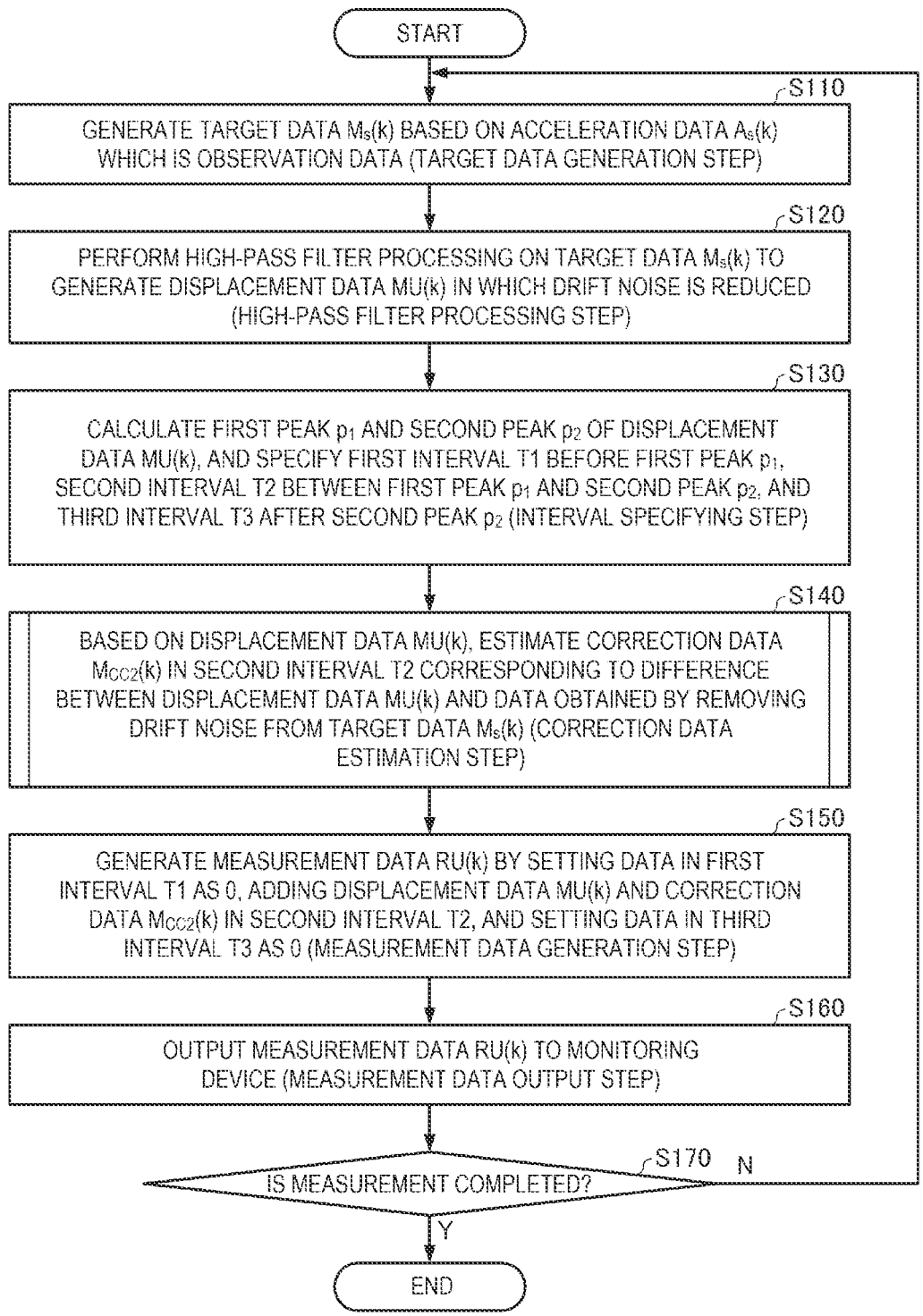
FIG. 26 is a flowchart showing an example of a procedure of a measurement method according to a second embodiment.

FIG. 26 is a flowchart showing an example of a procedure of the measurement method of the second embodiment for measuring the displacement of the superstructure 7 of the bridge 5. In the present embodiment, the measurement device 1 executes the procedure shown in FIG. 26.

As shown in FIG. 26, first, in a target data generation step S110, the measurement device 1 acquires the acceleration data $A_s(k)$ which is observation data, and generates the target data $M_s(k)$. Specifically, the measurement device 1 generates the target data $M_s(k)$ by performing calculations of Equations (14) and (15). The processing of the target data generation step S110 is the same as the processing of the target data generation step S1 of FIG. 23.

Next, in a high-pass filter processing step S120, the measurement device 1 performs high-pass filter processing on the target data $M_s(k)$ including the drift noise and generated in step S110, so as to generate the displacement data MU(k) as drift noise reduction data in which the drift noise is reduced, as in Equation (16). The processing of the high-pass filter processing step S120 is the same as the processing of the high-pass filter processing step S2 in FIG. 23.

Next, in an interval specifying step S130, the measurement device 1 calculates the first peak $p_1 = (k_1, mu_1)$ and the second peak $p_2 = (k_2, mu_2)$ of the displacement data MU(k) generated in step S120, and specifies the first interval T1 before the first peak $p_1$, the second interval T2 between the first peak $p_1$ and the second peak $p_2$, and the third interval T3 after the second peak $p_2$. That is, the first interval T1 is an interval of $k \le k_1$, the second interval T2 is an interval of $k_1 < k < k_2$, and the third interval T3 is an interval of $k_2 \le k$. The processing of the interval specifying step S130 is the same as the processing of the interval specifying step S31 of FIG. 24.

Next, in a correction data estimation step S140, the measurement device 1 generates, based on the displacement data MU(k) generated in step S120, the correction data $M_{CC2}(k)$ in the second interval T2 corresponding to the difference between the displacement data MU(k) and the data obtained by removing the drift noise from the target data $M_s(k)$. Specifically, the measurement device 1 generates the correction data $M_{CC2}(k)$ by performing calculations of Equations (20) to (23).

Next, in a measurement data generation step S150, the measurement device 1 generates the measurement data RU(k) by setting data in the first interval T1 as 0, adding the displacement data MU(k) generated in step S120 and the correction data $M_{CC2}(k)$ generated in step S140 in the second interval T2, and setting data in the third interval T3 as 0, as in Equation (29).

Next, in a measurement data output step S160, the measurement device 1 outputs the measurement data RU(k) generated in step S150 to the monitoring device 3. Specifically, the measurement device 1 transmits the measurement data RU(k) to the monitoring device 3 via the communication network 4.

The processing of the measurement data output step S160 is the same as the processing of the measurement data output step S5 of FIG. 23.

Then, in step S170, the measurement device 1 repeats the processing of steps S110 to S160 until the measurement of the displacement of the superstructure 7 of the bridge 5 is completed.

Figure 27:
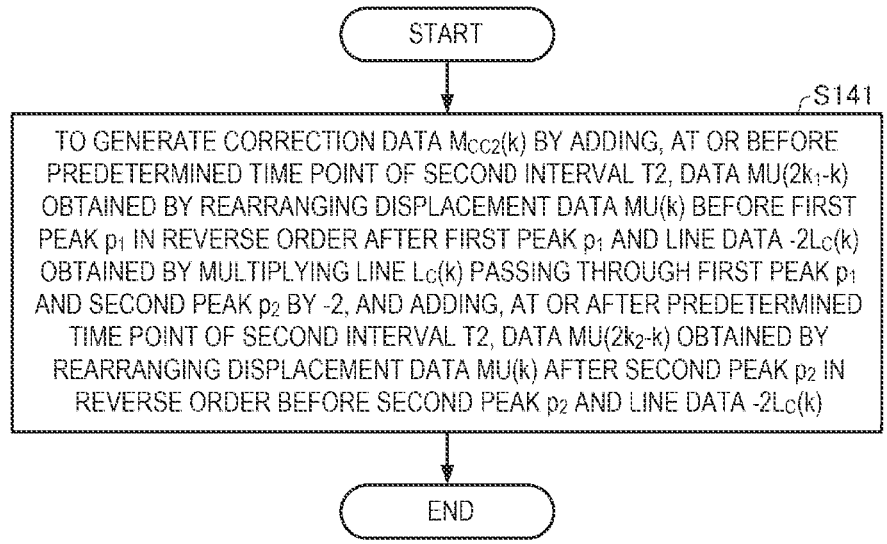
FIG. 27 is a flowchart showing an example of a procedure of a correction data estimation step in the second embodiment.

FIG. 27 is a flowchart showing an example of a procedure of the correction data estimation step S140 in FIG. 26.

As shown in FIG. 27, in step S141, the measurement device 1 generates the correction data $M_{CC2}(k)$ by adding, at or before the predetermined time point of the second interval T2, the data $MU(2k_1-k)$ obtained by rearranging the displacement data MU(k) before the first peak $p_1$ in the reverse order after the first peak $p_1$ and the line data $-2L_C(k)$ obtained by multiplying the line $L_C(k)$ passing through the first peak $p_1$ and the second peak $p_2$ by $-2$, and adding, at or after the predetermined time point of the second interval T2, the data $MU(2k_2-k)$ obtained by rearranging the displacement data MU(k) after the second peak $p_2$ in the reverse order before the second peak $p_2$ and the line data $2L_C(k)$, as in Equation (23).

Figure 28:
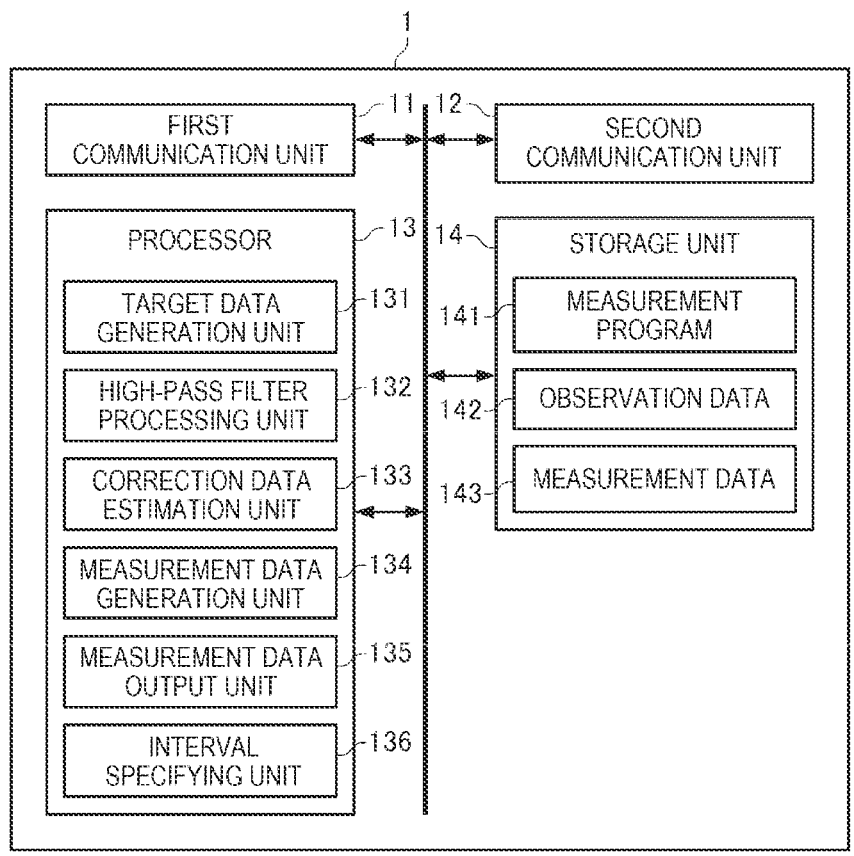
FIG. 28 is a diagram showing a configuration example of a measurement device according to the second embodiment.

FIG. 28 is a diagram showing a configuration example of the measurement device 1 according to the second embodiment. As shown in FIG. 28, the measurement device 1 according to the second embodiment includes the first communication unit 11, the second communication unit 12, the processor 13, and the storage unit 14, similarly to the first embodiment. Since functions of the first communication unit 11, the second communication unit 12, and the storage unit 14 are similar to those in the first embodiment, description thereof will be omitted.

In the present embodiment, the processor 13 functions as the target data generation unit 131, the high-pass filter processing unit 132, the correction data estimation unit 133, the measurement data generation unit 134, the measurement data output unit 135 and an interval specifying unit 136 by executing the measurement program 141 stored in the storage unit 14. That is, the processor 13 includes the target data generation unit 131, the high-pass filter processing unit 132, the correction data estimation unit 133, the measurement data generation unit 134, the measurement data output unit 135, and the interval specifying unit 136.

The functions of the target data generation unit 131, the high-pass filter processing unit 132, and the measurement data output unit 135 are similar as those in the first embodiment, and thus description thereof will be omitted. The target data generation unit 131 performs the processing of the target data generation step S110 in FIG. 26. The high-pass filter processing unit 132 performs the processing of the high-pass filter processing step S120 in FIG. 26. The measurement data output unit 135 performs the processing of the measurement data output step S160 in FIG. 26.

Next, the interval specifying unit 136 calculates the first peak $p_1 = (k_1, mu_1)$ and the second peak $p_2 = (k_2, mu_2)$ of the displacement data MU(k) generated by the high-pass filter processing unit 132, and specifies the first interval T1 before the first peak $p_1$, the second interval T2 between the first peak $p_1$ and the second peak $p_2$, and the third interval T3 after the second peak $p_2$. That is, the interval specifying unit 136 performs the processing of the interval specifying step S130 in FIG. 26.

The correction data estimation unit 133 generates, based on the displacement data MU(k) generated by the high-pass filter processing unit 132, the correction data $M_{CC2}(k)$ in the second interval T2 corresponding to the difference between the displacement data MU(k) and the data obtained by removing the drift noise from the target data $M_s(k)$. The correction data estimation unit 133 generates the correction data $M_{CC2}(k)$ by performing calculations of Equations (20) to (23).

Specifically, the correction data estimation unit 133 generates the correction data $M_{CC2}(k)$ by adding, at or before the predetermined time point of the second interval T2, the data $MU(2k_1-k)$ obtained by rearranging the displacement data MU(k) before the first peak $p_1$ in the reverse order after the first peak $p_1$ and the line data $-2L_C(k)$ obtained by multiplying the line $L_C(k)$ passing through the first peak $p_1$ and the second peak $p_2$ by $-2$, and adding, at or after the predetermined time point of the second interval T2, the data $MU(2k_2-k)$ obtained by rearranging the displacement data MU(k) after the second peak $p_2$ in the reverse order before the second peak $p_2$ and the line data $2L_C(k)$, as in Equation (23). As described above, the correction data estimation unit 133 performs the processing of the correction data estimation step S140 in FIG. 26, specifically, the processing of step S141 in FIG. 27.

The measurement data generation unit 134 generates the measurement data RU(k) by setting data in the first interval T1 as 0, adding the displacement data MU(k) generated by the high-pass filter processing unit 132 and the correction data $M_{CC2}(k)$ generated by the correction data estimation unit 133 in the second interval T2, and setting data in the third interval T3 as 0, as in Equation (29). That is, the measurement data generation unit 134 performs the processing of the measurement data generation step S150 in FIG. 26. The measurement data RU(k) generated by the measurement data generation unit 134 is stored in the storage unit 14 as the measurement data 143.

As described above, the measurement program 141 is a program that causes the measurement device 1, which is a computer, to execute each procedure of the flowchart shown in FIG. 26.

In the measurement method of the second embodiment described above, the measurement device 1 generates the displacement data MU(k), in which the drift noise is reduced, using the target data $M_s(k)$ to be processed, and specifies the first interval T1, the second interval T2, and the third interval T3 and estimates the correction data $M_{CC}(k)$ in the second interval T2, based on a feature of the displacement data MU(k). Since in the second interval T2, the correction data $M_{CC}(k)$ corresponds to the difference between the displacement data MU(k) and the data obtained by removing the drift noise from the target data $M_s(k)$, the correction data $M_{CC}(k)$ includes the significant signal component removed by the high-pass filter processing. Therefore, according to the measurement method of the second embodiment, the measurement device 1 can generate the measurement data RU(k) in which the drift noise is reduced with respect to the target data $M_s(k)$ by setting data in the first interval T1 and data in the third interval T3 as 0, and adding the displacement data MU(k) and the correction data $M_{CC}(k)$ in the second interval T2. According to the measurement method of the second embodiment, the measurement device 1 generates the displacement data MU(k) and the correction data $M_{CC2}(k)$ using the target data $M_s(k)$ to be processed, adds the displacement data MU(k) and the correction data $M_{CC2}(k)$ in the second interval T2, and thereby the measurement device 1 can generate the measurement data RU(k), in which the drift noise is reduced, without preparing information for reducing the drift noise in advance. Therefore, by using the measurement method of the second embodiment, accurate measurement data RU(k) can be obtained regardless of a change in environment, and cost reduction can be achieved.

According to the measurement method of the second embodiment, in order to generate the measurement data RU(k), the measurement device 1 does not need to generate the correction data $M_{CC1}(k)$ and $M_{CC3}(k)$ and add the displacement data MU(k), and the correction data $M_{CC1}(k)$ and $M_{CC3}(k)$ in the first interval T1 and the third interval T3, and thus the calculation amount is reduced.

In particular, according to the measurement method of the second embodiment, the measurement device 1 can generate more appropriate correction data $M_{CC2}(k)$ in the second interval T2 based on the feature of the displacement data MU(k) in which the drift noise is reduced with respect to the target data $M_s(k)$, and thus the estimation accuracy of the generated correction data $M_{CC2}(k)$ can be improved.

In addition, according to the measurement method of the second embodiment, it is possible to achieve the same effects as those of the measurement method of the first embodiment.

3. Modification

The present disclosure is not limited to the present embodiments, and various modifications can be made within the scope of the gist of the present disclosure.

Although in the above embodiments, the observation device is the sensor 2 that outputs the acceleration data $A_s(k)$ and the target data is the target data $M_s(k)$ obtained by integrating the acceleration data $A_s(k)$ twice, the observation device and the target data are not limited thereto. For example, the observation device may be a contact-type displacement meter, a ring-type displacement meter, a laser displacement meter, a pressure-sensitive sensor, an image processing-based displacement measurement device, or an optical fiber-based displacement measurement device, and the target data may be observation data observed by any of these observation devices. The contact-type displacement meter, the ring-type displacement meter, the laser displacement meter, the image processing-based displacement measurement device, or the optical fiber-based displacement measurement device measures a displacement of the observation point R caused by traveling of the railway vehicle 6. The pressure-sensitive sensor detects a change in stress at the observation point R caused by traveling of the railway vehicle 6. For example, the observation device may be a velocity sensor, and the target data may be data obtained by integrating the velocity detected by the velocity sensor. According to the measurement methods, the measurement device 1 can accurately measure the displacement of the superstructure 7 using the data of the displacement, the stress change, or the velocity.

Figure 29:
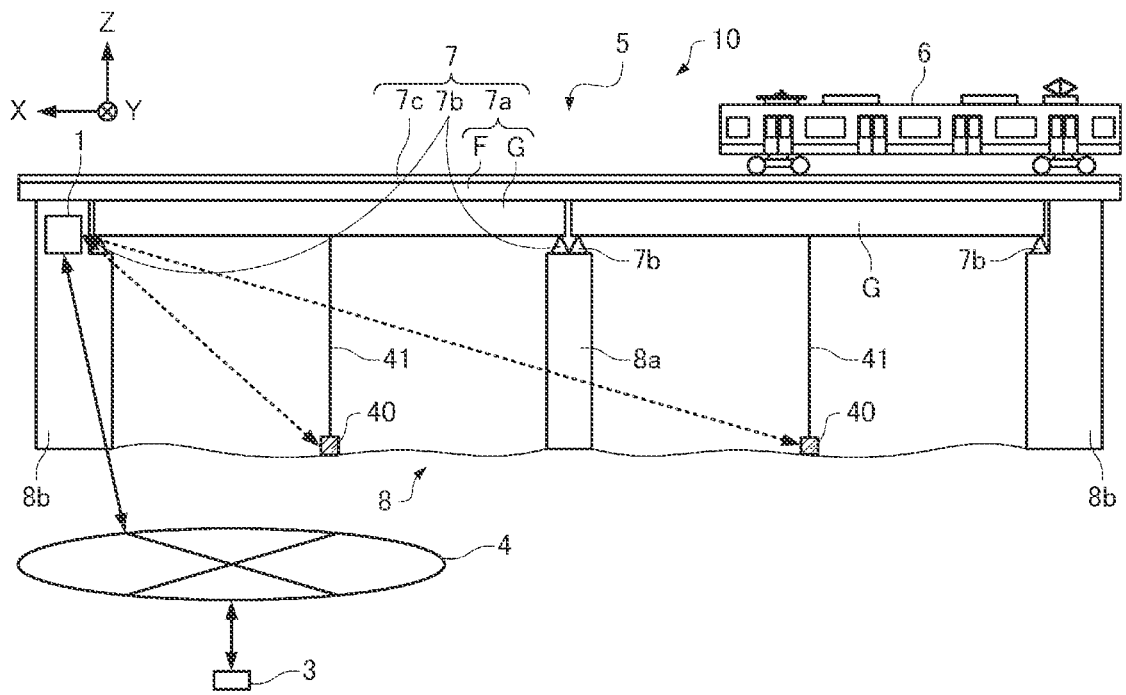
FIG. 29 shows another configuration example of the measurement system.
Figure 30:
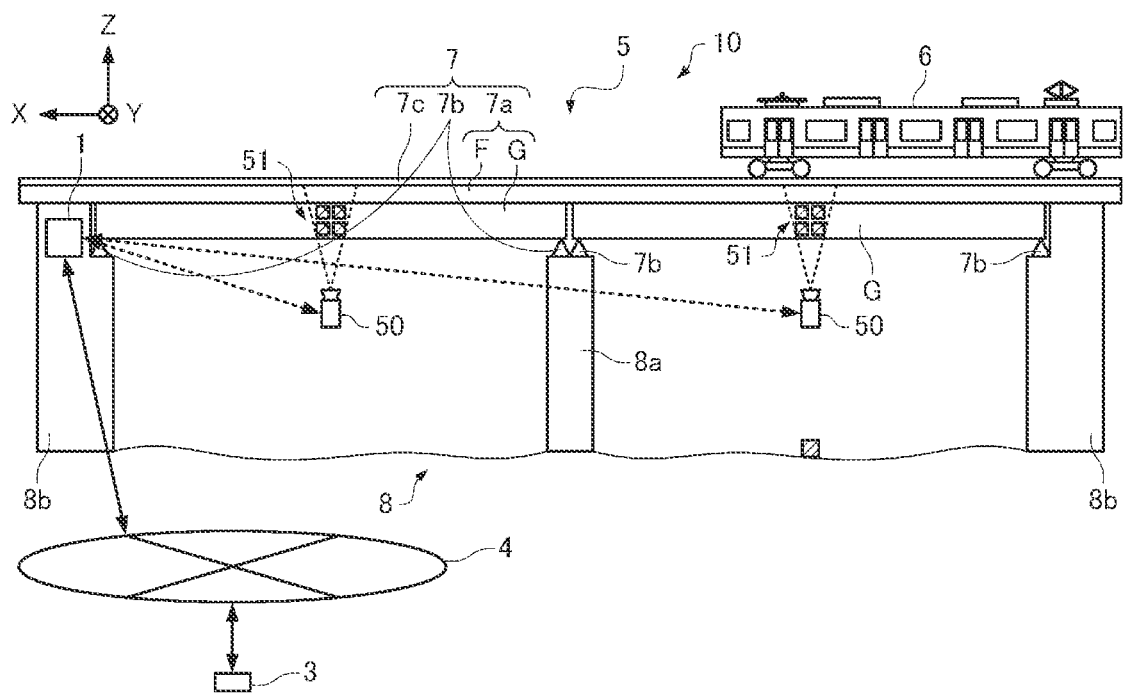
FIG. 30 shows another configuration example of the measurement system.

As an example, FIG. 29 shows a configuration example of the measurement system 10 using a ring-type displacement meter as the observation device. FIG. 30 shows a configuration example of the measurement system 10 using an image processing-based displacement measurement device as the observation device. In FIG. 29 and FIG. 30, the same components as those in FIG. 1 are denoted by the same reference numerals, and description thereof will be omitted. In the measurement system 10 shown in FIG. 29, a piano wire 41 is fixed between an upper surface of a ring-type displacement meter 40 and a lower surface of the main girder G immediately above the ring-type displacement meter 40, and the ring-type displacement meter 40 measures a displacement of the piano wire 41 caused by bending of the superstructure 7 and transmits the measured target data $M_s(k)$ to the measurement device 1. The measurement device 1 generates the measurement data RU(k) obtained by removing drift noise from the target data $M_s(k)$ transmitted from the ring-type displacement meter 40. In the measurement system 10 shown in FIG. 30, a camera 50 transmits, to the measurement device 1, an image obtained by imaging a target 51 provided on a side surface of the main girder G. The measurement device 1 processes the image transmitted from the camera 50, calculates the displacement of the target 51 caused by the deflection of the superstructure 7 to generate the target data $M_s(k)$, and generates the measurement data RU(k), in which the drift noise is removed, based on the generated target data $M_s(k)$. In the example of FIG. 30, the measurement device 1 generates the target data $M_s(k)$ as an image processing-based displacement measurement device, but a displacement measurement device (not illustrated) different from the measurement device 1 may generate the target data $M_s(k)$ by image processing.

Figure 31:
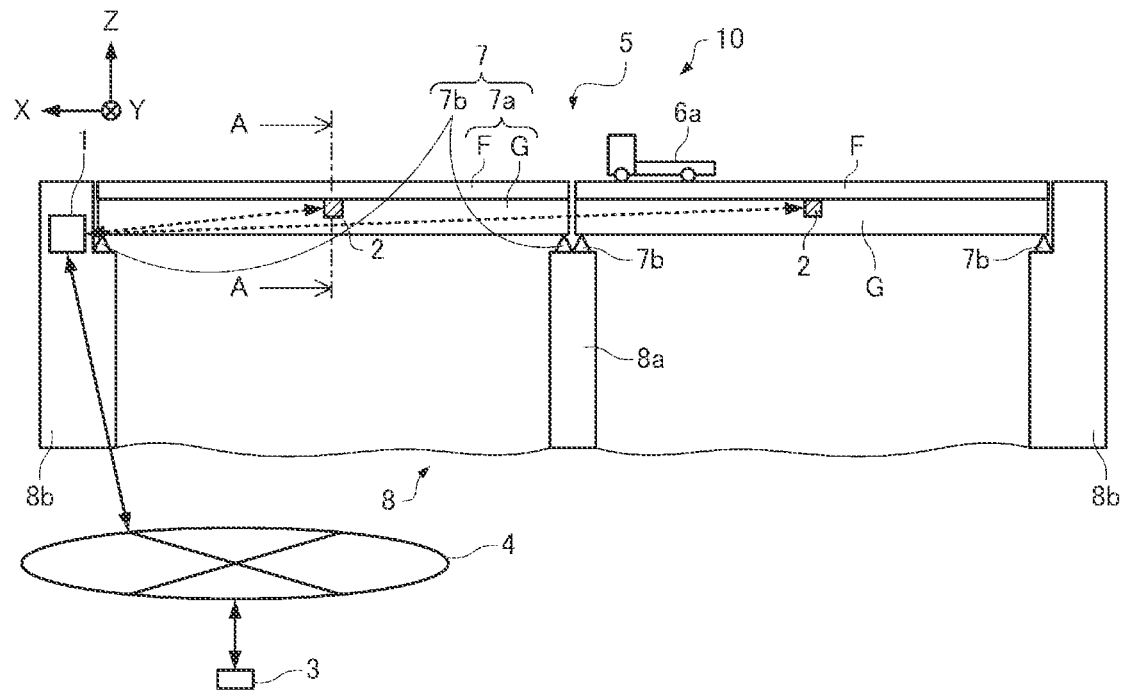
FIG. 31 shows another configuration example of the measurement system.
Figure 32:
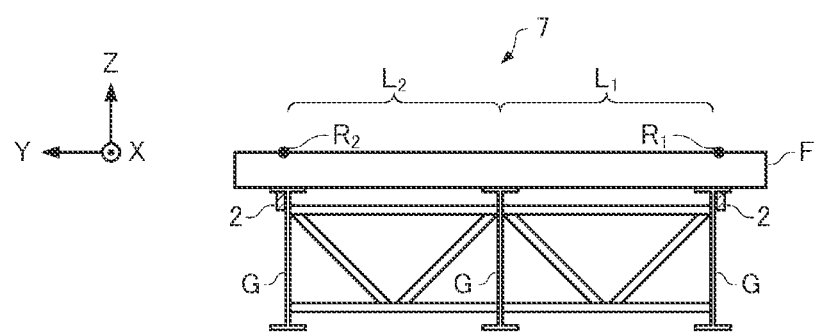
FIG. 32 is a cross-sectional view of a superstructure of FIG. 31 taken along line A-A.

In the embodiments described above, the bridge 5 is a railroad bridge, and the moving object moving on the bridge 5 is the railway vehicle 6, but the bridge 5 may be a road bridge, and the moving object moving on the bridge 5 may be a vehicle such as an automobile, a road train, or a construction vehicle. FIG. 31 illustrates a configuration example of the measurement system 10 in a case where the bridge 5 is a road bridge and a vehicle 6a moves on the bridge 5. In FIG. 31, the same components as those in FIG. 1 are denoted by the same reference numerals. As illustrated in FIG. 31, the bridge 5, which is a road bridge, includes the superstructure 7 and the substructure 8, similarly to the railroad bridge. FIG. 32 is a cross-sectional view of the superstructure 7 taken along line A-A of FIG. 31. As shown in FIGS. 31 and 32, the superstructure 7 includes the bridge floor 7a and the support 7b, and the bridge floor 7a includes the floor plate F, the main girder G, and a cross girder which is not shown. As shown in FIG. 31, the substructure 8 includes bridge piers 8a and bridge abutments 8b. The superstructure 7 is a structure across any one of the bridge abutment 8b and the bridge pier 8a adjacent to each other, two adjacent bridge abutments 8b, and two adjacent bridge piers 8a. Both end portions of the superstructure 7 are located at positions of the bridge abutment 8b and the bridge pier 8a adjacent to each other, at positions of the two adjacent bridge abutments 8b, or at positions of the two adjacent bridge piers 8a.

The bridge 5 is, for example, a steel bridge, a girder bridge, or an RC bridge.

Each sensor 2 is installed at position of a central portion of the superstructure 7 in a longitudinal direction, specifically, at a central portion of the main girder G in the longitudinal direction. Each sensor 2 is not limited to being installed at the central portion of the superstructure 7 as long as each sensor 2 can detect an acceleration for calculating the displacement of the superstructure 7. When each sensor 2 is provided on the floor plate F of the superstructure 7, the sensor 2 may be damaged due to traveling of the vehicle 6a, and the measurement accuracy may be affected by local deformation of the bridge floor 7a, so that in the example of FIGS. 31 and 32, each sensor 2 is provided at the main girder G of the superstructure 7.

As shown in FIG. 32, the superstructure 7 has two lanes $L_1$ and $L_2$ and three main girders G to which the vehicle 6a as a moving object can move. In the example of FIGS. 31 and 32, in the central portion in the longitudinal direction of the superstructure 7, the sensors 2 are provided at two main girders at both ends, an observation point $R_1$ is provided at a position of a surface of the lane $L_1$ vertically above one of the sensors 2, and an observation point $R_2$ is provided at a position of a surface of the lane $L_2$ vertically above the other of the sensor 2. That is, the two sensors 2 are observation devices for observing the observation points $R_1$ and $R_2$, respectively. Although the two sensor 2 for observing the observation points $R_1$ and $R_2$ may be provided at positions where the accelerations generated at the observation points $R_1$ and $R_2$ due to the traveling of the vehicle 6a can be detected, it is desirable that the sensors 2 are provided at positions close to the observation points $R_1$ and $R_2$. The number and installation positions of the sensors 2 are not limited to the example shown in FIGS. 31 and 32, and various modifications can be made.

The measurement device 1 calculates displacements of bending of the lanes $L_1$ and $L_2$ caused by the traveling of the vehicle 6a based on the acceleration data output from the sensors 2, and transmits information on the displacements of the lanes $L_1$ and $L_2$ to the monitoring device 3 via the communication network 4. The monitoring device 3 may store the information in a storage device (not illustrated), and may perform processing such as monitoring of the vehicle 6a and abnormality determination of the superstructure 7 based on the information, for example.

In the embodiments described above, each sensor 2 is provided at the main girder G of the superstructure 7, but the sensor may be provided on the surface of or inside the superstructure 7, at the lower surface of the floor plate F, at the bridge pier 8a, or the like. In the embodiments described above, the superstructure of the bridge is described as an example of the structure, but the present disclosure is not limited thereto, and it is sufficient that the structure is deformed due to the movement of the moving object.

A railway vehicle or a vehicle passing through a bridge is a vehicle that has a large weight and can be measured by BWIM. The BWIM is an abbreviation of bridge weigh in motion, and is a technology in which a bridge is regarded as a "scale", deformation of the bridge is measured, and thereby the weight and the number of axles of the railway vehicle and vehicle passing through the bridge is measured. The superstructure of the bridge, which enables analysis of the weight of the railway vehicle or the vehicle, that travels on the bridge, based on a response such as deformation and strain, is a structure in which the BWIM functions. The BWIM system, which applies a physical process between an action on the superstructure of the bridge and the response, enables the measurement of the weight of the vehicle that travels on the bridge.

The embodiments and modifications described above are merely examples, and the present disclosure is not limited thereto. For example, it is also possible to appropriately combine the embodiments and modifications.

The present disclosure includes a configuration substantially the same as the configuration described in the embodiment, for example, a configuration having the same function, method and result, or a configuration having the same purpose and effect. The present disclosure includes a configuration obtained by replacing a non-essential portion of the configuration described in the embodiment. The present disclosure includes a configuration having the same operation and effect as the configuration described in the embodiments, or a configuration capable of achieving the same purpose. Further, the present disclosure includes a configuration in which a known technique is added to the configuration described in the embodiment.

The following contents are derived from the embodiments and modifications described above.

According to an aspect of the present disclosure, a measurement method includes: a high-pass filter processing step of performing high-pass filter processing on target data including a drift noise to generate drift noise reduction data in which the drift noise is reduced; a correction data estimation step of estimating, based on the drift noise reduction data, correction data corresponding to a difference between the drift noise reduction data and data obtained by removing the drift noise from the target data; and a measurement data generation step of generating measurement data by adding the drift noise reduction data and the correction data.

In the measurement method, the drift noise reduction data in which the drift noise is reduced is generated using target data to be processed, and the correction data is estimated based on the drift noise reduction data. Further, since the correction data corresponds to the difference between the drift noise reduction data and the data obtained by removing the drift noise from the target data, the correction data includes a significant signal component removed by the high-pass filter processing. Therefore, according to the measurement method, by adding the drift noise reduction data and the correction data, it is possible to generate the measurement data in which the drift noise is reduced with respect to the target data. According to the measurement method, by generating the drift noise reduction data, and the correction data using the target data to be processed, and adding the drift noise reduction data, and the correction data, the measurement data in which the drift noise is reduced can be generated without preparing information for reducing the drift noise in advance. Therefore, by using the measurement method, accurate measurement data can be obtained regardless of a change in environment, and cost reduction can be achieved.

In the measurement method of the above aspect, the correction data estimation step may include: an interval specifying step of calculating a first peak and a second peak of the drift noise reduction data and specifying a first interval before the first peak, a second interval between the first peak and the second peak, and a third interval after the second peak, a first interval correction data generation step of generating first interval correction data by inverting a sign of the drift noise reduction data in the first interval, a second interval correction data generation step of generating second interval correction data by adding, at or before a predetermined time point of the second interval, data obtained by rearranging the drift noise reduction data before the first peak in a reverse order after the first peak and line data obtained by multiplying a line passing through the first peak and the second peak by −2, and adding, at or after the predetermined time point of the second interval, data obtained by rearranging the drift noise reduction data after the second peak in a reverse order before the second peak and the line data, a third interval correction data generation step of generating third interval correction data by inverting a sign of the drift noise reduction data in the third interval, and a correction data generation step of adding the first interval correction data, the second interval correction data, and the third interval correction data to generate the correction data.

According to the measurement method, the three intervals can be specified based on a feature of the drift noise reduction data in which the drift noise is reduced with respect to the target data, and more appropriate correction data can be generated in each interval, so that the estimation accuracy of the generated correction data can be improved.

According to an aspect of the present disclosure, a measurement method includes: a high-pass filter processing step of performing high-pass filter processing on target data including a drift noise to generate drift noise reduction data in which the drift noise is reduced; an interval specifying step of calculating a first peak and a second peak of the drift noise reduction data and specifying a first interval before the first peak, a second interval between the first peak and the second peak, and a third interval after the second peak; a correction data estimation step of estimating, based on the drift noise reduction data, correction data in the second interval corresponding to a difference between the drift noise reduction data and data obtained by removing the drift noise from the target data; and a measurement data generation step of generating measurement data by setting data in the first interval as 0, adding the drift noise reduction data and the correction data in the second interval, and setting data in the third interval as 0.

According to the measurement method, the drift noise reduction data in which drift noise is reduced is generated using target data to be processed, the three intervals are specified based on a feature of the drift noise reduction data, and the correction data is estimated in the second interval. Further, in the second interval, since the correction data corresponds to the difference between the drift noise reduction data and the data obtained by removing the drift noise from the target data, the correction data includes a significant signal component removed by the high-pass filter processing. Therefore, according to the measurement method, by setting data in the first interval and data in the third interval as 0, and adding the drift noise reduction data and the correction data in the second interval, it is possible to generate the measurement data in which the drift noise is reduced with respect to the target data. According to the measurement method, by generating the drift noise reduction data, and the correction data using the target data to be processed, and adding the drift noise reduction data, and the correction data in the second interval, the measurement data in which the drift noise is reduced can be generated without preparing information for reducing the drift noise in advance. Therefore, by using the measurement method, accurate measurement data can be obtained regardless of a change in environment, and cost reduction can be achieved.

According to the measurement method, in order to generate the measurement data, there is no need to generate the correction data and to add the drift noise reduction data and the correction data in the first interval and the third interval, so that the calculation amount is reduced.

In the measurement method of the above aspect, in the correction data estimation step, the correction data may be generated by adding, at or before a predetermined time point of the second interval, data obtained by rearranging the drift noise reduction data before the first peak in a reverse order after the first peak and line data obtained by multiplying a line passing through the first peak and the second peak by −2, and adding, at or after the predetermined time point of the second interval, data obtained by rearranging the drift noise reduction data after the second peak in a reverse order before the second peak and the line data.

According to the measurement method, based on a feature of the drift noise reduction data in which the drift noise is reduced with respect to the target data, more appropriate correction data can be generated in the second interval, so that the estimation accuracy of the generated correction data can be improved.

In the measurement method of the above aspect, the high-pass filter processing may be processing of subtracting, from the target data, data obtained by performing moving average processing or FIR filter processing on the target data.

According to the measurement method, the high-pass filter processing, can be easily performed, and in the moving average processing or the FIR filter processing, a group delay of each signal component included in the target data is constant, so that the correction data can be estimated with high accuracy.

In the measurement method of the above aspect, the target data may be data of a displacement of a structure caused by a moving object that moves on the structure.

According to the measurement method, since the data of the displacement of the structure caused by the movement of the moving object is obtained as the measurement data in which the drift noise is reduced, the displacement of the structure can be measured with high accuracy.

In the measurement method of the above aspect, the target data may be data obtained by integrating twice an acceleration in a direction intersecting a surface of the structure on which the moving object moves.

According to this measurement method, it is possible to accurately measure the displacement of the structure using the output data of the acceleration sensor installed at the structure.

In the measurement method of the above aspect, the target data may be observation data observed by a contact-type displacement meter, a ring-type displacement meter, a laser displacement meter, a pressure-sensitive sensor, an image processing-based displacement measurement device or an optical fiber-based displacement measurement device, or data obtained by integrating a velocity detected by a velocity sensor.

According to the measurement method, it is possible to accurately measure the displacement of the structure using the data of a displacement, a stress change, or a velocity.

In the measurement method of the above aspect, the structure may be a superstructure of a bridge.

According to the measurement method, it is possible to accurately measure a displacement of the superstructure of the bridge.

In the measurement method of the above aspect, a frequency of the drift noise may be lower than a minimum value of a natural vibration frequency of the superstructure.

According to the measurement method, by setting a cutoff frequency of the high-pass filter processing to be higher than the frequency of the drift noise of the superstructure and lower than the minimum value of the natural vibration frequency, the drift noise in the generated displacement data can be reduced without reducing the signal component and the harmonic component of the natural vibration frequency of the superstructure.

In the measurement method of the above aspect, the moving object may be a vehicle or a railway vehicle.

According to the measurement method, it is possible to accurately measure the displacement of the structure caused by movement of the vehicle or the railway vehicle.

In the measurement method of the above aspect, the target data may include data of a waveform that projects in a positive direction or a negative direction.

According to the measurement method, since more appropriate correction data can be generated based on a feature of the waveform that projects in the positive direction or the negative direction, it is possible to improve the estimation accuracy of the generated correction data.

In the measurement method of the above aspect, the waveform may be a rectangular waveform, a trapezoidal waveform, or a sine half-wave waveform.

According to the measurement method, since more appropriate correction data can be generated based on a feature of the rectangular waveform, the trapezoidal waveform or the sine half-wave waveform, it is possible to improve the estimation accuracy of the generated correction data.

According to an aspect of the present disclosure, a measurement device includes: a high-pass filter processing unit configured to perform high-pass filter processing on target data including a drift noise to generate drift noise reduction data in which the drift noise is reduced; a correction data estimation unit configured to estimate, based on the drift noise reduction data, correction data corresponding to a difference between the drift noise reduction data and data obtained by removing the drift noise from the target data; and a measurement data generation unit configured to generate measurement data by adding the drift noise reduction data and the correction data.

In the measurement device, the drift noise reduction data in which the drift noise is reduced is generated using target data to be processed, and the correction data is estimated based on the drift noise reduction data. Further, since the correction data corresponds to the difference between the drift noise reduction data and the data obtained by removing the drift noise from the target data, the correction data includes a significant signal component removed by the high-pass filter processing. Therefore, according to the measurement device, by adding the drift noise reduction data and the correction data, it is possible to generate the measurement data in which the drift noise is reduced with respect to the target data. According to the measurement device, by generating the drift noise reduction data, and the correction data using the target data to be processed, and adding the drift noise reduction data, and the correction data, the measurement data in which the drift noise is reduced can be generated without preparing information for reducing the drift noise in advance. Therefore, by using the measurement device, accurate measurement data can be obtained regardless of a change in environment, and cost reduction can be achieved.

According to an aspect of the present disclosure, a measurement system includes: the measurement device according to the above aspect; and an observation device configured to observe an observation point, in which the target data is data based on observation data observed by the observation device.

According to an aspect of the present disclosure, a non-transitory computer-readable storage medium stores a measurement program, and the measurement program causes a computer to execute: a high-pass filter processing step of performing high-pass filter processing on target data including a drift noise to generate drift noise reduction data in which the drift noise is reduced; a correction data estimation step of estimating, based on the drift noise reduction data, correction data corresponding to a difference between the drift noise reduction data and data obtained by removing the drift noise from the target data; and a measurement data generation step of generating measurement data by adding the drift noise reduction data and the correction data.

In the measurement program, the drift noise reduction data in which the drift noise is reduced is generated using target data to be processed, and the correction data is estimated based on the drift noise reduction data. Further, since the correction data corresponds to the difference between the drift noise reduction data and the data obtained by removing the drift noise from the target data, the correction data includes a significant signal component removed by the high-pass filter processing. Therefore, according to the measurement program, by adding the drift noise reduction data and the correction data, it is possible to generate the measurement data in which the drift noise is reduced with respect to the target data. According to the measurement program, by generating the drift noise reduction data, and the correction data using the target data to be processed, and adding the drift noise reduction data, and the correction data, the measurement data in which the drift noise is reduced can be generated without preparing information for reducing the drift noise in advance. Therefore, by using the measurement program, accurate measurement data can be obtained regardless of a change in environment, and cost reduction can be achieved.

What is claimed is:

1. A measurement method for causing a processor to execute a program stored in a memory, the measurement method comprising executing on the processor:
a target data generation step of acquiring target data, the target data corresponding to observation data sensed by an acceleration sensor, the acceleration sensor being disposed at a superstructure of a bridge, the observation data corresponding to displacement of the superstructure due to moving of a movable object on the superstructure, the target data including a drift noise of the acceleration sensor;
a high-pass filter processing step of performing high-pass filter processing on the target data to generate drift noise reduction data in which the drift noise is reduced;
a correction data estimation step of estimating, based on the drift noise reduction data, correction data corresponding to a difference between the drift noise reduction data and data obtained by removing the drift noise from the target data;
a measurement data generation step of generating measurement data by adding the drift noise reduction data and the correction data; and
an abnormality determination step of determining an abnormality of the superstructure of the bridge based on the measurement data.

2. The measurement method according to claim 1, wherein
the correction data estimation step includes:
an interval specifying step of calculating a first peak and a second peak of the drift noise reduction data, and specifying a first interval before the first peak, a second interval between the first peak and the second peak, and a third interval after the second peak;
a first interval correction data generation step of generating first interval correction data by inverting a sign of the drift noise reduction data in the first interval;
a second interval correction data generation step of generating second interval correction data by adding, at or before a predetermined time point of the second interval, data obtained by rearranging the drift noise reduction data before the first peak in a reverse order after the first peak and line data obtained by multiplying a line passing through the first peak and the second peak by −2, and adding, at or after the predetermined time point of the second interval, data obtained by rearranging the drift noise reduction data after the second peak in the reverse order before the second peak and the line data;
a third interval correction data generation step of generating third interval correction data by inverting the sign of the drift noise reduction data in the third interval; and
a correction data generation step of generating the correction data by adding the first interval correction data, the second interval correction data, and the third interval correction data.

3. The measurement method according to claim 1, wherein
the high-pass filter processing step is a process of subtracting, from the target data, data obtained by performing moving average processing or finite impulse response (FIR) filter processing on the target data.

4. The measurement method according to claim 1, wherein
the observation data corresponds to acceleration sensed by the acceleration sensor, and
the target data is obtained by integrating twice the acceleration in a direction intersecting a surface of the superstructure on which the movable object moves.

5. The measurement method according to claim 1, wherein
the observation data further includes data observed by a contact-type displacement meter, a ring-type displacement meter, a laser displacement meter, a pressure-sensitive sensor, an image processing-based displacement measurement device or an optical fiber-based displacement measurement device, or data obtained by integrating a velocity detected by a velocity sensor.

6. The measurement method according to claim 1, wherein
a frequency of the drift noise is lower than a minimum value of a natural vibration frequency of the superstructure.

7. The measurement method according to claim 1, wherein
the movable object is a vehicle or a railway vehicle.

8. The measurement method according to claim 1, wherein
the target data includes data of a waveform that projects in a positive direction or a negative direction.

9. The measurement method according to claim 8, wherein
the waveform is a rectangular waveform, a trapezoidal waveform, or a sine half-wave waveform.

10. A measurement method for causing a processor to execute a program stored in a memory, the measurement method comprising executing on the processor:
a target data generation step of acquiring target data, the target data corresponding to observation data sensed by an acceleration sensor, the acceleration sensor being disposed at a superstructure of a bridge, the observation data corresponding to displacement of the superstructure due to moving of a movable object on the superstructure, the target data including a drift noise of the acceleration sensor;
a high-pass filter processing step of performing high-pass filter processing on the target data to generate drift noise reduction data in which the drift noise is reduced;
an interval specifying step of calculating a first peak and a second peak of the drift noise reduction data, and specifying a first interval before the first peak, a second interval between the first peak and the second peak, and a third interval after the second peak;
a correction data estimation step of estimating, based on the drift noise reduction data, correction data in the second interval corresponding to a difference between the drift noise reduction data and data obtained by removing the drift noise from the target data;
a measurement data generation step of generating measurement data by setting data in the first interval as 0, adding the drift noise reduction data and the correction data in the second interval, and setting data in the third interval as 0; and
an abnormality determination step of determining an abnormality of the superstructure of the bridge based on the measurement data.

11. The measurement method according to claim 10, wherein
in the correction data estimation step,
the correction data is estimated by adding, at or before a predetermined time point of the second interval, data obtained by rearranging the drift noise reduction data before the first peak in a reverse order after the first peak and line data obtained by multiplying a line passing through the first peak and the second peak by −2, and adding, at or after the predetermined time point of the second interval, data obtained by rearranging the drift noise reduction data after the second peak in the reverse order before the second peak and the line data.

12. A measurement device, comprising:
a memory configured to store a program; and
a processor configured to execute the program so as to:
acquire target data, the target data corresponding to observation data sensed by an acceleration sensor, the acceleration sensor being disposed at a superstructure of a bridge, the observation data corresponding to displacement of the superstructure due to moving of a movable object on the superstructure, the target data including a drift noise and a vibration component of the superstructure;
perform high-pass filter processing on the target data to generate drift noise reduction data in which the drift noise is reduced;
estimate, based on the drift noise reduction data, correction data corresponding to a difference between the drift noise reduction data and data obtained by removing the drift noise from the target data;

generate measurement data by adding the drift noise reduction data and the correction data; and determine an abnormality of the superstructure of the bridge based on the measurement data.

13. A measurement system, comprising:
the measurement device according to claim 12; and
the acceleration sensor.

14. A non-transitory computer-readable storage medium storing a measurement program for causing a computer to execute a process by a processor so as to perform:

a target data generation step of acquiring target data, the target data corresponding to observation data sensed by an acceleration sensor, the acceleration sensor being disposed at a superstructure of a bridge, the observation data corresponding to displacement of the superstructure due to moving of a movable object on the superstructure, the target data including a drift noise and a vibration component of the superstructure;

a high-pass filter processing step of performing high-pass filter processing on the target data to generate drift noise reduction data in which the drift noise is reduced;

a correction data estimation step of estimating, based on the drift noise reduction data, correction data corresponding to a difference between the drift noise reduction data and data obtained by removing the drift noise from the target data;

a measurement data generation step of generating measurement data by adding the drift noise reduction data and the correction data; and an abnormality determination step of determining an abnormality of the superstructure of the bridge based on the measurement data.

* * * * *